(12) United States Patent
Sehgal et al.

(10) Patent No.: US 11,973,802 B2
(45) Date of Patent: Apr. 30, 2024

(54) DYNAMICALLY MAPPING ENTITY MEMBERS TO PERMISSION ROLES FOR DIGITAL SURVEY RESOURCES BASED ON DIGITAL METADATA

(71) Applicant: Qualtrics, LLC, Provo, UT (US)

(72) Inventors: Suarabh Sehgal, Seattle, WA (US); Pranip Borah, Newcastle, WA (US)

(73) Assignee: Qualtrics, LLC, Provo, UT (US)

( * ) Notice: Subject to any disclaimer, the term of this patent is extended or adjusted under 35 U.S.C. 154(b) by 523 days.

(21) Appl. No.: 17/015,546

(22) Filed: Sep. 9, 2020

(65) Prior Publication Data
US 2022/0078195 A1 Mar. 10, 2022

(51) Int. Cl.
*H04L 9/40* (2022.01)
*G06Q 30/0203* (2023.01)

(52) U.S. Cl.
CPC ......... *H04L 63/20* (2013.01); *G06Q 30/0203* (2013.01); *H04L 63/102* (2013.01)

(58) Field of Classification Search
CPC ....... H04L 63/10; H04L 63/102; H04L 63/20; G06Q 30/0203; G06Q 30/0217; G06Q 30/0245; G16H 10/20
See application file for complete search history.

(56) References Cited

U.S. PATENT DOCUMENTS

| | | | | |
|---|---|---|---|---|
| 6,577,713 B1 * | 6/2003 | Peterson | ............. | H04M 3/4938 379/88.22 |
| 7,882,250 B2 * | 2/2011 | Bieber | ................... | G06Q 10/06 709/219 |
| 9,262,745 B2 * | 2/2016 | Zur | ........................ | G06Q 10/10 |
| 10,460,333 B2 * | 10/2019 | Skoler | .................... | G07F 17/329 |
| 11,048,244 B2 * | 6/2021 | Kaufman | ............ | G06Q 30/0203 |
| 11,379,435 B2 * | 7/2022 | Seth | ..................... | G06F 16/2455 |
| 2002/0088000 A1 * | 7/2002 | Morris | ............... | H04N 1/00156 725/105 |
| 2004/0128183 A1 * | 7/2004 | Challey | .................. | G06Q 30/02 705/7.32 |
| 2007/0094606 A1 * | 4/2007 | Kirkpatrick | ............ | G06Q 30/02 715/760 |

(Continued)

OTHER PUBLICATIONS

Wikipedia: The Free Encyclopedia; Role-based access control; Date downloaded Sep. 23, 2020; https://en.wikipedia.org/wiki/Role-based_access_control.

*Primary Examiner* — Eric W Shepperd
(74) *Attorney, Agent, or Firm* — Keller Preece PLLC

(57) ABSTRACT

The present disclosure relates to systems, non-transitory computer-readable media, and methods for utilizing a digital permission mapping model to dynamically map entity members to digital survey resource permission roles based on metadata corresponding to the entity members. In particular, in one or more embodiments, the disclosed systems implement permissions based on identification of various resource classes and attribute values corresponding to the digital resources. The disclosed systems can compare survey resource classes, survey attribute categories, and attribute values of requested digital survey resources to the resource permission role of a requesting entity member. The disclosed systems can manage the digital content based on the digital survey resource permission role and these determined comparisons.

20 Claims, 15 Drawing Sheets

(56) References Cited

U.S. PATENT DOCUMENTS

| | | | | |
|---|---|---|---|---|
| 2008/0028313 | A1* | 1/2008 | Ebert | G06Q 30/02 |
| | | | | 715/780 |
| 2008/0126173 | A1* | 5/2008 | Crysel | G06Q 10/06393 |
| | | | | 705/7.32 |
| 2008/0275767 | A1* | 11/2008 | Rafie | G07C 13/00 |
| | | | | 705/12 |
| 2010/0043080 | A1* | 2/2010 | Overpeck | G06Q 30/02 |
| | | | | 380/278 |
| 2012/0095796 | A1* | 4/2012 | Gately | G06Q 10/06311 |
| | | | | 705/7.13 |
| 2017/0017974 | A1* | 1/2017 | Li | G06Q 30/0203 |
| 2019/0266231 | A1* | 8/2019 | Banerjee | G06N 3/02 |
| 2019/0377785 | A1* | 12/2019 | N | G06F 40/20 |
| 2020/0007549 | A1* | 1/2020 | Gormley | H04L 63/102 |
| 2020/0387917 | A1* | 12/2020 | Trim | G06N 5/045 |
| 2021/0042366 | A1* | 2/2021 | Hicklin | G06Q 10/10 |
| 2021/0064448 | A1* | 3/2021 | Kochura | G06F 3/04842 |
| 2021/0142294 | A1* | 5/2021 | Anhalt | G06Q 10/1053 |
| 2021/0158090 | A1* | 5/2021 | Santra | G06N 3/044 |
| 2023/0367821 | A1* | 11/2023 | Hicklin | G06N 20/00 |

* cited by examiner

DYNAMICALLY MAPPING ENTITY MEMBERS TO PERMISSION ROLES FOR DIGITAL SURVEY RESOURCES BASED ON DIGITAL METADATA

BACKGROUND

Recent years have seen significant improvements in digital management systems that control sharing of large digital data volumes across client devices. For example, conventional systems can facilitate the sharing of large digital data repositories online and locally among large numbers of client devices. To illustrate, conventional systems can provide content based on permissions set by authors of the digital data. Additionally, conventional systems can allow an administrator to designate other client devices or users to access portions of digital data volumes by entering user identifiers.

Although conventional systems can share digital content to a large number of client devices, such systems have a number of problems in relation to accuracy, efficiency, and flexibility of operation. For instance, many conventional systems require an administrator device and corresponding user to assign individual permissions to each user for each digital data item. This approach often results inaccurate distribution of digital data volumes. Indeed, client devices can often access inappropriate, sensitive digital data while being excluded from needed digital data. This is particularly significant in relation to digital surveys. For instance, digital surveys are dynamically created and modified, include extremely sensitive information, and often require distribution to a variety of computing devices across computer networks. Inappropriate, inaccurate distribution of such sensitive data volumes can undermine security and cause users to migrate to alternate systems.

Further, conventional systems are inefficient. Indeed, as mentioned, input of permissions for digital data is inefficient and time consuming. Moreover, this approach requires significant user interfaces and user interactions to identify pertinent data volumes and corresponding permissions for each user. Accordingly, conventional systems require undue resources and action from implementing computing devices. To illustrate, with regard to digital survey data, conventional systems can require implementing devices to access individual digital surveys and/or responses and assign permissions for individual users/client devices through an inordinate number of user interactions and user interfaces.

Additionally, conventional systems are also rigid and inflexible. For instance, upon defining permissions for particular users, conventional systems are inflexible in modifying those permissions to accommodate changed circumstances or different data types. For example, as users and corresponding computing devices change locations, roles, or responsibilities, conventional systems often require additional user interactions and inefficiencies to determine permissions that reflect the corresponding changes. To illustrate with regard to digital surveys, digital survey data can be dynamically generated or revised and individuals/computing device having access to such data can change locations, roles, or responsibilities at any time.

These along with additional problems and issues exist with regard to conventional digital management systems.

BRIEF SUMMARY

Embodiments of the present disclosure provide benefits and/or solve one or more of the foregoing or other problems in the art with systems, non-transitory computer-readable media, and methods for utilizing a digital permission mapping model to dynamically map entity members to digital survey resource permission roles based on metadata corresponding to the entity members. More specifically, the disclosed systems can implement permissions corresponding to various resource classes and attribute values corresponding to the digital resources. The disclosed systems can compare survey resource classes, survey attribute categories, and attribute values corresponding to the resource permission role of a requesting entity member to the of requested digital resources to survey resource classes and attribute values corresponding to the requested resource. Utilizing this comparison, the disclosed systems can manage the digital content based on the digital survey resource permission role.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
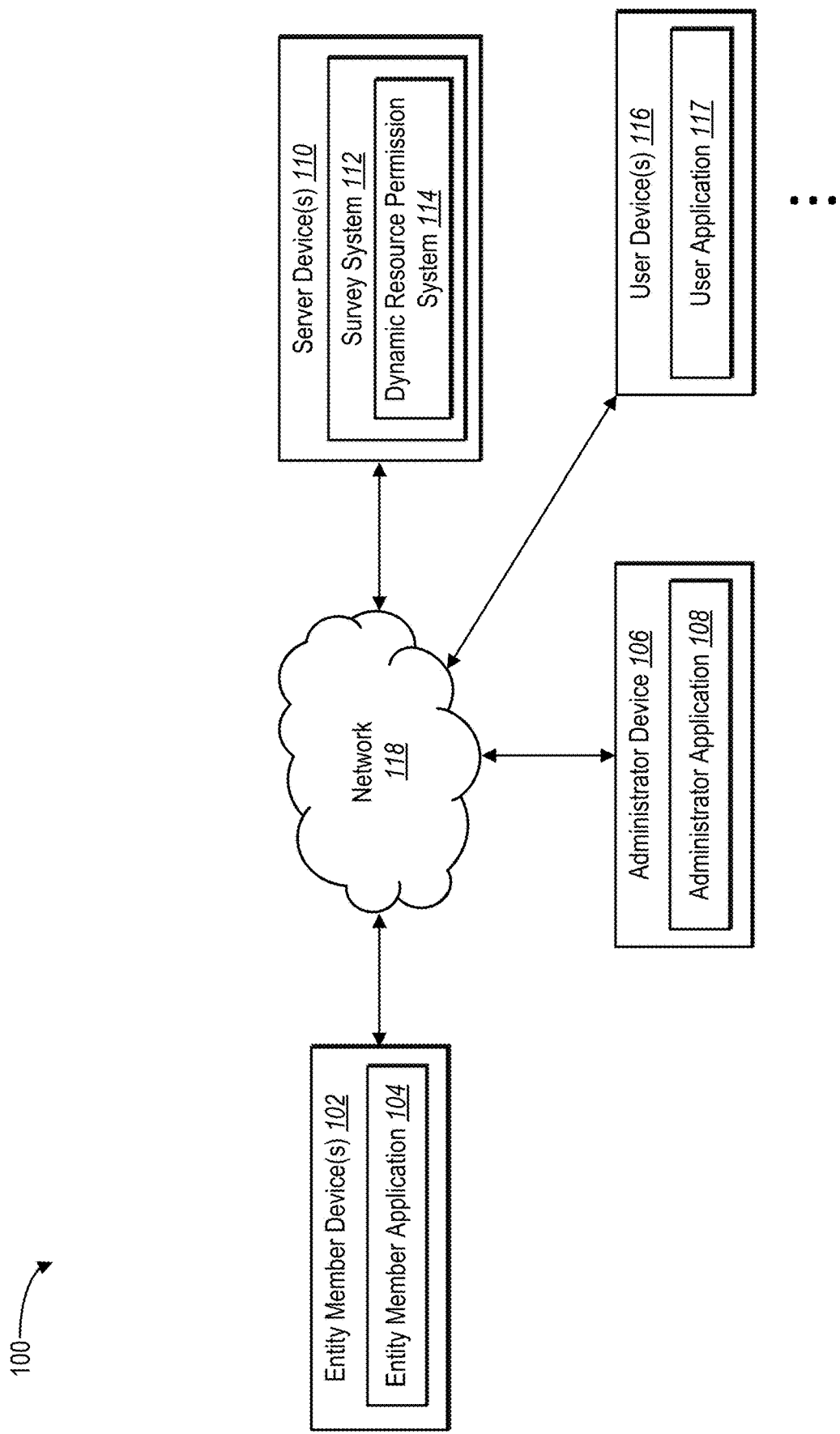
FIG. 1 illustrates a diagram of an environment in which a dynamic resource permissions system can operate in accordance with one or more embodiments.

This disclosure describes one or more embodiments of a dynamic resource permissions system that utilizes a digital permission mapping model and metadata corresponding to entity members to dynamically map the entity members to digital survey resource permission roles. More specifically, the dynamic resource permissions system can utilize metadata associated with an entity member to determine and dynamically update an entity-defined permission role for that entity member. Further, the dynamic resource permissions system generates precise definitions of permission roles, including permissions based on various entity-defined resource attributes for various digital survey resources. Indeed, the dynamic resource permissions system can provide a user interface for defining and creating digital survey resources (with particular attribute values) and define permission roles corresponding to attribute values corresponding to the digital survey resource. The dynamic resource permissions system can recognize these resource attributes for the digital survey resources and can compare access permissions associated with a permission role to the resource attributes to determine whether and how to provide access to a requested digital survey resource.

To illustrate, the dynamic resource permissions system can identify digital metadata that reflects digital features of an entity member. The dynamic resource permissions system can then utilize that digital metadata and a digital permission mapping model to automatically map the entity member to a digital survey resource permission role. Further, the dynamic resource permissions system can identify a request from a client device associated with the entity member to access a digital survey resource. In one or more embodiments, the dynamic resource permissions system provides access to the digital survey resource based on the digital survey resource permission role assigned to the entity member.

As indicated by the foregoing discussion, the dynamic resource permissions system can operate in conjunction with a computer-implemented survey system that administers, monitors, and/or analyzes digital surveys. For example, the dynamic resource permission system can distribute digital survey to client devices, monitor user interaction with the digital survey to collect digital survey responses, apply analytical models to the digital survey responses, and then distribute the digital survey results and corresponding analysis across computing devices. However, different portions of the digital surveys and digital survey responses can be specific to particular members (e.g., individuals) within a particular entity (e.g., within a business or governmental organization). For example, digital surveys regarding a particular location may be pertinent to member associated with that location within an entity. Similarly personal or sensitive data entered with regard to digital survey responses is often limited to only members with training or legal authority to handle the personal or sensitive data.

The dynamic resource permissions system can determine and manage access to digital survey resources within the survey system. In one or more embodiments, the dynamic resource permissions system can provide access to different digital survey resources based on digital survey resource permission roles. More specifically, the dynamic resource permissions system can identify and utilize digital metadata associated with an entity to control digital survey resource permission roles for the entity. For example, the dynamic resource permissions system can receive an organizational hierarchy corresponding to an entity from an entity device. In one or more embodiments, the dynamic resource permissions system can determine and recognize positions within the entity's organizational hierarchy based on various metadata attributes of entity members.

Additionally, the dynamic resource permissions system automatically maps entity members to digital survey resource permission roles based on digital metadata associated with the entity members. For example, the dynamic resource permissions system can utilize and interpret digital metadata reflecting digital features of entity members such as a job title or an address. In one or more embodiments, the dynamic resource permissions system utilizes a digital permission mapping model to automatically assign entity members to digital survey resource permission roles. The digital permission mapping model can include a variety of models, including heuristic models (e.g., applying global rules to map a plurality of individuals to different roles) or machine learning models (e.g., classification neural networks that map individuals to particular roles).

Additionally, the dynamic resource permissions system can automatically update a digital survey resource permission role based on changes to the digital metadata corresponding to an entity member. To illustrate, the dynamic resource permissions system can automatically identify a change to entity member digital metadata (e.g., the dynamic resource permission system can monitor or receive updates to an organizational hierarchy). In response to detecting a change to entity member digital metadata, the dynamic resource permissions system can update digital survey resource permission roles. For example, the dynamic resource permissions system can apply the digital permission mapping model to determine whether the change to entity member digital metadata requires a change to a digital survey resource permission role for the entity member.

As mentioned briefly above, in one or more embodiments, the dynamic resource permissions system can provide user interfaces for defining various survey resource classes. These survey resource classes, in turn, can allow the dynamic resource permission system to accurately and dynamically provide access to client devices with appropriate digital survey resource permission roles. For example, the dynamic resource permission system create a schema of a plurality of different survey resource classes, where each digital survey resource includes one or more attribute categories. To illustrate, the dynamic resource permission system can provide a user interface for defining a "survey dashboards" survey resource class that includes a variety of attribute categories (e.g., dashboard id, dashboard elements, location, etc.).

The dynamic resource permissions system can also provide user interfaces for generating digital survey resources (corresponding to the survey resource classes). For example, the dynamic resource permissions system can provide user interfaces for generating a resource from a survey resource class, by defining attribute values for the particular attribute categories. To illustrate, the dynamic resource permission system can generate a survey dashboard with a particular dashboard id and selected dashboard elements for a particular location.

The dynamic resource permissions system can then utilize defined digital survey resources and corresponding attribute values to enforce digital survey resource permission roles. For instance, the dynamic resource permissions system can define digital survey resource permission roles relative to attribute classes and/or attribute values corresponding to digital survey resources. For instance, the dynamic resource permission system can define a digital survey resource permission role to allow access to digital dashboards (e.g., an attribute class) including information regarding a particular location (e.g., an attribute value). In this manner, the dynamic resource permissions system can recognize and utilize survey resource classes, survey attribute categories, and survey attribute values to define and implement access permissions for digital survey resource permission roles. Indeed, the dynamic resource permissions can generate and apply digital survey resource permission roles that efficiently outline global, project-based, or attribute-based access to digital survey resources (without having to undergo the time-consuming and inefficient process of defining access policies for each individual and corresponding file).

To illustrate, the dynamic resource permissions system can receive a request to view a digital survey resource from a client device of an entity member. The dynamic resource permissions system can determine the digital survey resource permission role mapped to the entity member, including the survey resource classes and attribute values corresponding to the digital survey resource permission role. The dynamic resource permissions system can also determine the survey resource class, survey attribute categories, and survey attribute values corresponding to the requested digital survey resource. In one or more embodiments, the dynamic resource permissions system compares access permissions for the digital survey resource permission role to the determinations corresponding to the requested digital survey resource. Then, the dynamic resource permissions system can grant access based on the comparison. Accordingly, the dynamic resource permissions system can provide precise and accurate access to even a large volume of digital survey resources for a large entity.

The dynamic resource permissions system provides a variety of technical advantages and benefits over conventional systems and methods. For example, the dynamic resource permissions system can improve accuracy and system security relative to conventional systems. For example, by defining digital survey resources and utilizing a digital permission mapping model to automatically map digital survey resource permission roles to entity members, the dynamic resource permissions system can accurately determine permissions for individuals and client devices within large organizational computer networks. Specifically, the dynamic resource permissions system can utilize digital metadata corresponding to entity members to automatically assign digital survey resource permission roles that are utilized to access digital survey resources. Thus, the dynamic resource permissions system can provide more accurate access to digital survey resources, which reduces or eliminates improper distribution and bolsters security in distributing digital survey resources across client devices Further, the dynamic resource permissions system can improve flexibility relative to conventional systems. For example, the dynamic resource permissions system can dynamically define digital survey resources, define digital survey resource permission roles, and determine changes to digital metadata corresponding to entity members to automatically update access to digital survey resources over time. Accordingly, as roles, locations, responsibilities and digital survey resources dynamically change over time, the dynamic resource permissions system can flexibly adjust to accurately distribute digital survey resources across computer networks.

The dynamic resource permissions system can further improve flexibility relative to conventional systems by utilizing entity-defined resource modeling in access permissions for digital survey resource permission roles. As mentioned above, the dynamic resource permissions system defines survey resource classes (and attribute categories), which can be utilized in creating digital survey resources and corresponding attribute values. Utilizing this resource-based approach allows the dynamic resource permissions system to flexibly define permission roles and access entity-defined digital survey resources. For example, the dynamic resource permissions system can flexibly define permission roles based on survey resource classes and/or particular attribute values within a digital survey resource (without having to tie particular users/client devices to individual digital items).

Additionally, the dynamic resource permissions system can improve efficiency relative to conventional systems. For example, by automatically determining permissions based on entity member digital metadata and a digital permissions mapping model, the dynamic resource permissions system can reduce user interfaces and user interactions needed to determine permissions for individual digital items relative to individuals and corresponding computing devices. Further, system-facilitated resource modeling allows more precise definition of resources compared to conventional systems, which reduces user interactions and interfaces needed to correct erroneous permission allocations. Accordingly, the dynamic resource permissions system provides accurate permissions while improving efficiency by requiring fewer user interactions and fewer computing resources to generate and implement those permissions.

As illustrated by the foregoing discussion, the present disclosure utilizes a variety of terms to describe features and advantages of the dynamic resource permissions system. Additional detail is now provided regarding the meaning of such terms. For example, as used herein, the term "digital metadata" refers to a set of descriptive digital data. In particular, digital metadata can include a set of digital data (e.g., underlying features, descriptions, labels, or tags) that provide information regarding a digital data source (e.g., an entity member list or organizational hierarchy). In particular, the term "digital metadata" can include data reflecting digital features corresponding to entity members. To illustrate, digital metadata can include data reflecting job titles, addresses, team membership, and/or other entity member features.

Additionally, as used herein, the term "digital feature" refers to a digital attribute or aspect. In particular, the term "digital feature" can include various attributes of entity members. To illustrate, a digital feature can include a job title, position, a number of subordinate employees, an address, a location, an access level, years with an entity, previous activity with a survey system, or a variety of other attributes.

Further, as used herein, the term "entity" refers to an organization, group, or institution. In particular, the term "entity" can include any of a variety of groups, including organizations managing digital surveys and digital survey attributes. To illustrate, an entity can include an organization, corporation, institution, operation, government, or other establishment. Similarly, as used herein, the term "entity member" refers to an individual/person belonging to an entity (e.g., an employee, owner, member, partner, and/or contractor).

Also, as used herein, the term "digital permission mapping model" refers to a computer algorithm for determining a digital survey resource permission role corresponding to an entity member. In particular, the term "digital permission mapping model" can include an algorithm that utilizes digital metadata corresponding to an entity member to automatically map the entity member to a digital survey resource permission role.

Additionally, as used herein, the term "digital survey resource permission role" refers one or more access permissions corresponding to a position, individual, group, or role within an organization. In particular, the term "digital survey resource permission role" can include an indication of survey resource classes and/or survey attribute values accessible to a particular individual or role. Accordingly, a digital survey resource permission role can include a position (corresponding to access permissions)assigned based on entity member digital metadata. When assigned, a digital survey resource permission role can bestow access permissions on an entity member specific to the particular digital survey resource permission role.

Further, as used herein, the term "digital survey resource" refers to a digital item related to a digital survey defined by one or more attributes. In particular, the term "digital survey resource" can include digital items (e.g., digital surveys, digital survey responses, survey dashboards, etc.) including data related to a digital survey that are defined by a particular survey resource class and corresponding survey attribute categories populated with attribute values. In one or more embodiments, a digital survey resource includes various kinds of media that reflect survey data, such as charts, graphs, and other audiovisual media. For example, a digital survey resource can include a survey dashboard that communicates data related to the distribution and results of a digital survey, a listing of digital survey responses, a digital video about the distribution of a digital survey, and/or a pdf (portable document format) summarizing digital survey results. The dynamic resource permissions system can define a digital survey resources based on received entity-associated input. For example, the dynamic resource permissions system can define a survey resource class including particular survey attribute categories.

Accordingly, as used herein, the term "survey resource class" refers to a group, type, or classification of digital survey resource. In particular, the term "survey resource class" can include a group of digital survey resources defined based on survey attribute categories and/or attribute values of survey resources included in the survey attribute class. In one or more embodiments, survey resource classes can be entity-defined or defined by default. Survey resource classes can include survey dashboards, survey reports, survey responses, and/or other classifications of survey-related resources.

Thus, as used herein, the term "survey attribute category" refers to features or fields of a survey resource without regard to the content of those features or fields. In particular, the term "survey attribute category" can include a dashboard identifier, a project identifier, a location identifier, pages, or a variety of other content found in a survey resource. In one or more embodiments, a survey attribute category does not refer to the content of the particular field. For example, a survey attribute category can be a location identifier, but not the particular location identifier SLC (Salt Lake City).

Therefore, as used herein, the term "attribute value" refers to a particular entry, value, or quantity, corresponding to an attribute category. In particular, the term "attribute value" can include an entry corresponding to a survey attribute category for a particular digital survey resource. To illustrate, an attribute value can include the dashboard identifier "F2513" (for a dashboard identifier category) or a location identifier "LAS" (for a location category).

Turning now to the figures, FIG. 1 illustrates a block diagram of a system environment 100 in which a dynamic resource permissions system 114 can be implemented in accordance with one or more embodiments. As illustrated in FIG. 1, the system environment 100 includes entity member device(s) 102 including an entity member application 104 and an administrator device 106 including an administrator application 108. The system environment 100 further includes server device(s) 110 including a survey system 112, which itself includes the dynamic resource permissions system 114. The system environment 100 can also include user device(s) 116, which include a user application 117. Further, as shown in FIG. 1, the entity member device(s) 102, the administrator device 106, the user device(s) 116 and the server device(s) 110 can communicate over a network 118.

The entity member device(s) 102, the administrator device 106, and the user device(s) 116 can include various types of client devices. For example, the entity member device(s) 102, the administrator device 106, and the user device(s) 116 can include a phone (e.g., a smart phone), tablet, laptop computer, desktop computer, or another computer device as further explained below with reference to FIG. 10.

As also illustrated in FIG. 1, the system environment 100 includes the server device(s) 110. The server device(s) 110 may generate, store, process, receive, and transmit electronic data, such as digital surveys and digital survey resources. For example, the server device(s) 110 may identify (e.g., monitor and/or receive) data from the entity member device(s) 102, the administrator device 106, and/or the user device(s) 116. The server device(s) 110 can transmit data to the entity member device(s) 102, the administrator device 106, and the user device(s) 116, including based on digital survey resource permission roles. In some embodiments, the server device(s) 110 comprises a content server. The server device(s) 110 can also comprise an application server, a communication server, a web-hosting server, a survey hosting server, a digital content server, or a digital communication management server. Additionally, the server device(s) 110 can include one or more computing devices including those explained below with reference to FIG. 10.

As described below, the survey system 112 and the dynamic resource permissions system 114 can be implemented by the server device(s) 110. The survey system 112 and the dynamic resource permissions system 114 can also be implemented in whole or in part by the entity member device(s) 102, the administrator device 106, and the user device(s) 116. Although FIG. 1 illustrates a particular arrangement of the entity member device(s) 102, the administrator device 106, the user device(s) 116, the server device(s) 110, the survey system 112, and the dynamic resource permissions system 114, various additional arrangements are possible. For example, the survey system 112 and the server device(s) 110 may communicate directly with the entity member device(s) 102, the administrator device 106, and the user device(s) 116 and thus bypass the network 118.

For example, in one or more embodiments, the dynamic resource permissions system 114 can utilize a resource attribute model to define and create digital survey resources. In particular, based on user interaction with the administrator device, the system can define survey resource classes having survey attribute categories. The dynamic resource permissions system 114 can then generate digital survey resources from these survey resource classes. Further, one or more entity member device(s) 112 can request a digital survey reflecting particular survey parameters from the server device(s) 110. The server device(s) 110 (via the survey system 112) can generate a digital survey and distribute and implement the digital survey to the user device(s) 116. The server device(s) 110 can identify digital survey responses based on user interaction at the user device(s) 116, apply a variety of analytical models, and generate digital survey resources. For example, the server device(s) 110 can generate a dashboard reflecting responses to the digital survey. In particular, the server device(s) 110 can generate a dashboard from a dashboard survey class and populate attribute values corresponding to attribute categories from the dashboard survey class.

The server device(s) (via the dynamic resource permission system 114) can then distribute digital survey resources to entity member device(s) 102. For instance, the system can receive an organization hierarchy from the entity member device(s). Based on the organizational hierarchy, the dynamic resource permissions system 114 can apply a mapping model to map individuals to resource permission roles. Each resource permission role can include particular access permissions (e.g., defined by resource classes or attribute values). By comparing these access permissions to the digital survey resources, the dynamic resource permission system 114 can distribute digital survey resources to the entity member device(s) 102.

The entity member device(s) 102, the administrator device 106, and the user device(s) 116 communicate with the server device(s) 110 of the survey system 112 via a dedicated application on the entity member device(s) 102, the administrator device 106, and the user device(s) 116, respectively. In some embodiments, the entity member application 104, the administrator application 108, and the user application 117 comprise web browsers, applets, or other software applications (e.g., a native applications) available to the entity member device(s) 102, the administrator device 106, and the user device(s) 116, respectively. In some instances, the entity member application 104, the administrator application 108, and the user application 117 include instructions that, when executed by a processor, cause entity member device(s) 102, the administrator device 106, and the user device(s) 116 to respectively perform various functions or present one or more graphical user interfaces.

The network 118 can represent a network or collection of networks, such as the Internet, a local area network ("LAN"), a wide area network ("WAN"), or a combination of such networks described above or below. Thus, the network 118 may be any suitable network over which entity member device(s) 102, the administrator device 106, and the user device(s) 116 (or other components) may access the survey system 112 (or vice versa). Additional detail regarding the network 118 is provided below (e.g., in relation to FIG. 10).

Figure 2:
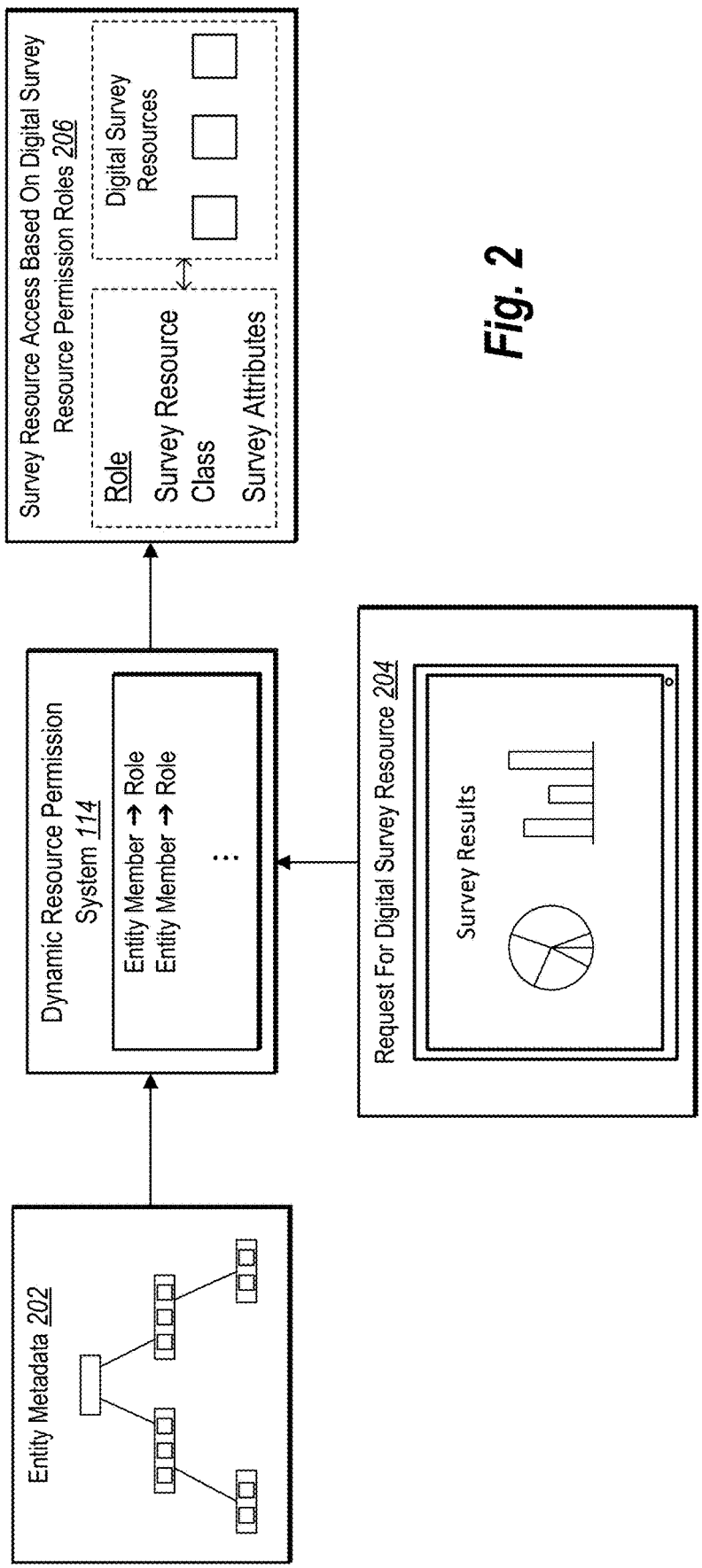
FIG. 2 illustrates an overview of providing digital survey resource access based on digital survey resource permission roles in accordance with one or more embodiments.

FIG. 2 illustrates the dynamic resource permissions system 114 providing access to digital survey resource based on digital survey resource permission roles in accordance with one or more embodiments. More specifically, the dynamic resource permissions system 114 utilizes entity member digital metadata to automatically determine digital survey resource permission roles for entity members. Then, the dynamic resource permissions system 114 receives and responds to requests for digital survey resources by providing access to digital survey resources based on the digital survey resource permission roles.

As shown in FIG. 2, the dynamic resource permissions system 114 receives the entity metadata 202. In one or more embodiments, the dynamic resource permissions system 114 receives the entity metadata 202 from an entity administrator device and/or entity member devices. Additionally, as will be discussed in greater detail with regard to FIG. 3, the entity metadata 202 can include a tree hierarchy and/or other information about the entity. In some embodiments, the dynamic resource permissions system 114 utilizes entity metadata to generate, train, or otherwise inform a digital permission mapping model.

Entity metadata 202 can include entity member digital metadata. As mentioned above, entity member digital metadata includes data reflecting digital features corresponding to entity members. Metadata can include data reflecting job titles, addresses, team membership, and other features of entity members. In some embodiments, the dynamic resource permissions system 114 utilizes the entity member digital metadata to determine digital survey resource permission roles for entity members.

As further shown in FIG. 2, the dynamic resource permissions system 114 receives a request for a digital survey resource 204. The dynamic resource permissions system 114 can receive the request for the digital survey resource 204 from an entity member device. More specifically, the dynamic resource permission system 114 can receive the request for the digital survey resource 204 directly from an entity member device or via a survey system. The request for the digital survey resource 204 can be a request to access the digital survey resource in a variety of capacities, such as a request to view, to edit, or to share the digital survey resource.

As shown in FIG. 2, and as discussed in greater detail below, the dynamic resource permission system 114 can assign entity members to digital survey resource permission roles. More specifically, the dynamic resource permissions system 114 can utilize a permission mapping model to automatically map entity members to digital survey resource permission roles based on entity metadata, including entity member digital metadata. The dynamic resource permissions system 114 can further manage digital survey resource permission roles and can provide access accordingly.

More specifically, as shown in FIG. 2, the dynamic resource permissions system 114 provides digital survey resource access based on digital survey resource permission roles 206. In one or more embodiments, digital survey resource permission roles include corresponding access permissions. In one or more embodiments, the access permissions designate access to digital survey resources of particular survey classes, having particular survey attribute categories, and/or having particular attribute values. For example, an access permission could designate permission to view and edit digital survey resources having both the project identifier "X" and a resource identifier beginning with "4."

Accordingly, in some embodiments, the dynamic resource permissions system 114 compares attribute categories and attribute values of the requested digital survey resource with the access permissions of the digital survey resource permission role assigned to the requesting entity member. Based on this comparison, the dynamic resource permissions system 114 determines whether to provide the requested digital survey resource to the requesting user. Further, based on this comparison, the dynamic resource permissions system 114 determines how to provide the requested digital survey resource.

Figure 3:
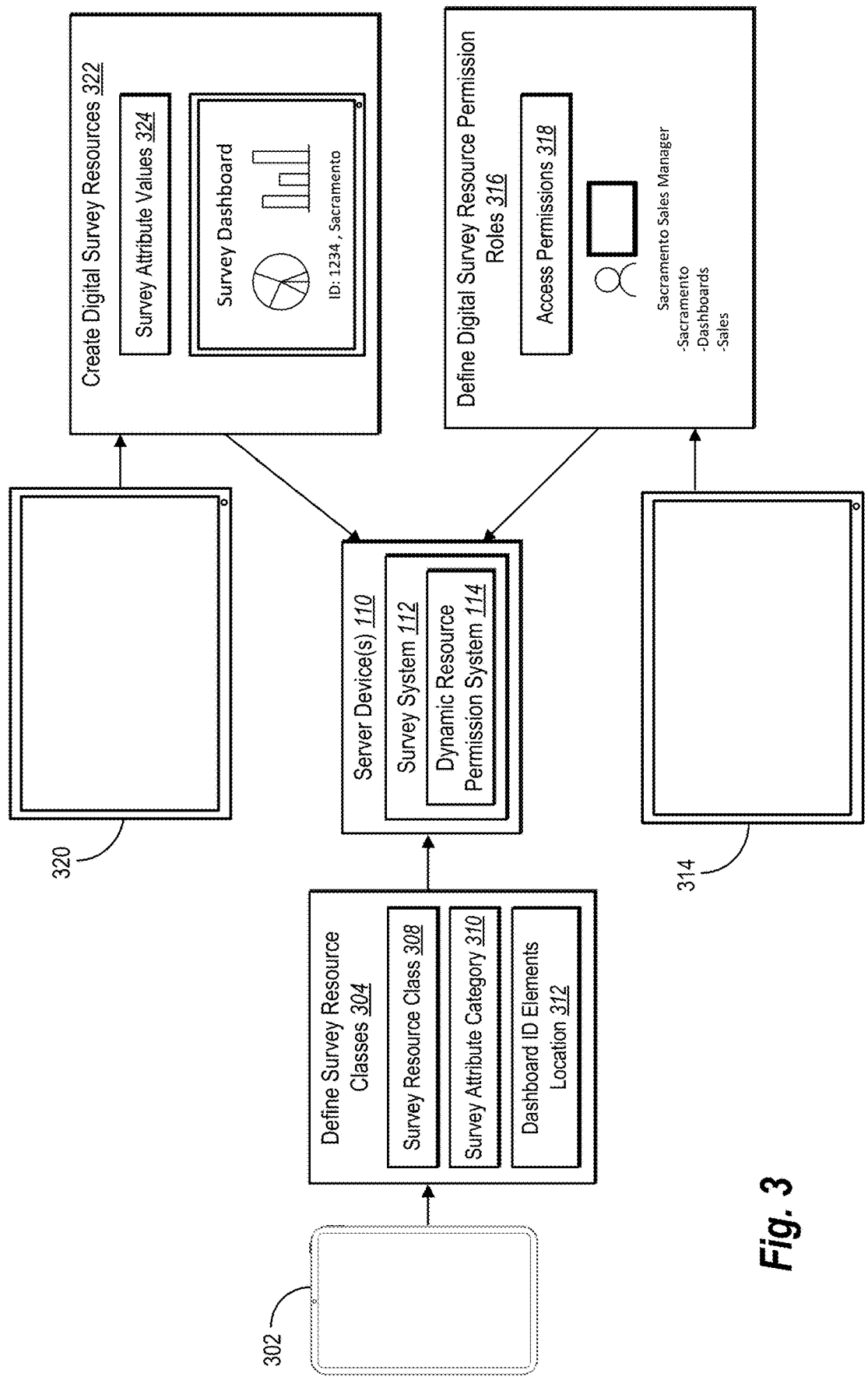
FIG. 3 illustrates defining and creating digital survey resources and digital survey resource permission roles in accordance with one or more embodiments.

As noted briefly above, the dynamic resource permissions system 114 can manage the definition, management, and creation of digital survey resources. FIG. 3 provides an illustration of the dynamic resource permissions system 114 generating and integrating digital survey resources, survey resource definitions, and digital survey resource permission roles. More specifically, FIG. 3 illustrates the dynamic resource permissions system 114 defining digital survey resources, creating digital survey resources, and defining digital survey resource permission roles based on received user input via various devices.

For example, as shown in FIG. 3, the computing device 302 can receive input corresponding to the definition of digital survey resources. In one or more embodiments, the device 302 can be an administrator device corresponding to an entity. In one or more other embodiments, the device 302 can be a third-party device. Additionally, as will be discussed in greater detail below with regard to FIG. 6, the computing device 302 can receive the user input corresponding to the definition of digital survey resources via a graphical user interface. In some embodiments, the graphical user interface includes various elements to define digital survey resources based on existing digital survey resources.

As shown in FIG. 3, the dynamic resource permissions system 114 can utilize the user input received from the computing device 302 to perform an act 304 of defining digital survey resource classes. In one or more embodiments, the dynamic resource permissions system 114 can generate an attribute-based definition of digital survey resources. More specifically, the dynamic resource permissions system 114 can generate definitions that enable recognition of entity-defined digital survey resources. Thus, the dynamic resource permissions system 114 can more effectively manage and provide access to digital survey resources particular to an entity.

As shown in FIG. 3, defining digital survey resources can include determining survey resource classes 308 and survey attribute categories 310. As discussed above, in some embodiments, a survey resource class is a group of digital survey resources having specific shared survey attribute categories. By way of example, as illustrated in FIG. 3, a survey resource class of dashboard can be defined as a digital survey resource having (1) a dashboard ID, (2) data elements, and (3) a location 312. The dynamic resource permissions system 114 can generate a variety of different resource classes (e.g., digital survey, digital survey question, digital survey response, etc.) having a variety of different attribute classes (e.g., project ID, entity group, privacy indicator, etc.)

In one or more embodiments, the dynamic resource permissions system 114 defines digital survey resources based on received user input at the computing device 302. More specifically, computing device 302 can provide user input of a digital survey resource class together with survey attribute categories corresponding to the survey attribute class. In some embodiments, the dynamic resource permissions system 114 can suggest attribute categories for a survey attribute class (e.g., based on common or recently used attribute categories).

Further, as shown in FIG. 3, the dynamic resource permissions system 114 can also create digital survey resource permission roles. In particular, as illustrated, the computing device 314 receives user input corresponding to the definition of digital survey resource permission roles. In some embodiments, the computing device 314 is an administrator device corresponding to an entity. In one or more other embodiments, the computing device 314 is a third-party device. The computing device 314 may be the same as the computing device 302, or the computing devices 302, 314 may be separate devices. Further, the computing device 314 can detect user input related to defining digital survey resource permission roles via a graphical user interface.

The dynamic resource permissions system 114 can utilize the user input received from the computing device 314 to perform an act 316 of defining digital survey resource permission roles. In one or more embodiments, the dynamic resource permissions system 114 utilizes user input received from the computing device 314 to determine access permissions 318 corresponding to digital survey resource permission roles. More specifically, the dynamic resource permissions system 114 can utilize defined survey resource classes, survey attribute categories, and attribute values to define access permissions 318 for digital survey resource permission roles.

In one or more embodiments, the dynamic resource permissions system 114 can define permission roles at various levels of detail corresponding to an entity. For example, the dynamic resource permissions system 114 can define digital survey resource permission roles on different "levels" including a global, a project-based, a location-based, and/or at other levels. The dynamic resource permissions system 114 can assign multiple digital survey resource permission roles to a single entity member, including different roles on different levels. Thus, the dynamic resource permissions system 114 can provide access to digital survey resources in discrete categories, without necessitating assignment of individual users to individual data items.

To illustrate, the dynamic resource permissions system 114 can utilize a digital permission mapping model to automatically map multiple digital survey resource permission roles onto a user based on entity member digital metadata. More specifically, the dynamic resource permissions system 114 can utilize different portions and/or overlapping portions of entity metadata to map the user on to different digital survey resource permission roles at different levels. For example, the dynamic resource permissions system 114 can map a user onto a global role based on an address, a work assignment list, and a job title in the entity member digital metadata. The dynamic resource permissions system 114 can further assign the same user to a project role for a particular project based on the work assignment list. Further, the dynamic resource permissions system 114 can map the same user onto a location-based digital survey resource permission role based on a telephone number in the entity member digital metadata.

As shown in FIG. 3, the digital survey resource permission role can include the access permissions 318. The access permissions 318 can specify digital survey resources corresponding to digital survey resource permission roles. Further, the access permissions 318 can specify what kind of access a digital survey resource permission role grants for various digital survey resources. For example, access permissions can designate viewing access for dashboards generated at a particular location (e.g., Sacramento) corresponding to a particular entity group (e.g., Sales). Moreover, the access permission can designate editing access for survey reports with tiles beginning "Q2," or sharing access for survey responses corresponding to a survey with a particular project identifier.

The dynamic resource permissions system 114 can define access permissions 318 for digital survey resource permission roles based on user input received at the computing device 314. For instance, the dynamic resource permissions system 114 can receive user input defining the digital survey resource permission roles via the unified graphical user interface. In some embodiments, the dynamic resource permissions system 114 receives this user input via definition elements. For example, the dynamic resource permissions system 114 can generate a user interface that includes elements for entering a particular role, survey resource classes, attribute categories, and/or attributes values that are accessible for the particular role.

Indeed, the dynamic resource permissions system 114 can receive and implement access permissions 318 that utilize digital survey resource definitions (as defined in the act 304). For example, the access permissions 318 can specify a particular survey resource class corresponding to a digital survey resource permission role. In another example, the access permissions 318 designate a particular survey resource class in combination with an attribute value that provides access for another digital survey resource permission role. The dynamic resource permissions system 114 can receive user input designating these specific survey resource classes, survey attribute categories, and/or survey attribute values for a particular kind of access and a particular digital survey resource permission role. Accordingly, the dynamic resource permissions system 114 allows an entity member or entity administrator to efficiently, accurately, and precisely designate groups of digital survey resources for access within digital survey resource permission roles.

Further, as shown in FIG. 3, the dynamic resource permissions system 114 can perform an act 322 of creating digital survey resources. More specifically, the dynamic resource permissions system 114 can receive user input related to the creation of digital survey resources via the computing device 320. The computing device 320 can be a user device, an entity member device, or an administrator device. Additionally, though FIG. 3 illustrates three computing devices 302, 314, and 320, the dynamic resource permissions system 114 can receive a variety of user input from a variety of user devices. Accordingly, the dynamic resource permissions system 114 can receive user input from a variety of computing devices to define survey resources/classes, the definition of digital survey resource permission roles, and the creation of digital survey resources.

The dynamic resource permissions system 114 can create digital survey resources via a survey creation graphical user interface. As discussed above, digital survey resources can include a variety digital surveys, reports, analyses, and other survey-related resources. The dynamic resource permissions system 114 can generate these resources automatically or in response to user input. For example, the permissions-based distribution system 116 can automatically generate a survey results report when a survey period ends. In another example, the permissions-based distribution system 116 can generate a survey report based on user selection of survey results, user design selection, and user placement of data.

As shown in FIG. 3, digital survey resources include survey attribute values 324. In some embodiments, the creation of a digital survey resource involves determining various survey attribute values 324 for various survey attribute categories. For example, generation of a survey dashboard involves determination of a dashboard identifier, identifying a location, and filling in elements or pages for the dashboard. The permissions-based distribution system 116 can generate these attribute values 324 for digital survey resources based on user selection, monitoring and detection of particular attributes (e.g., location of surveys or survey responses). default user preferences, or other user criteria. Accordingly, the permissions-based distribution system 116 can generate and manage various digital survey resources.

Figure 4:
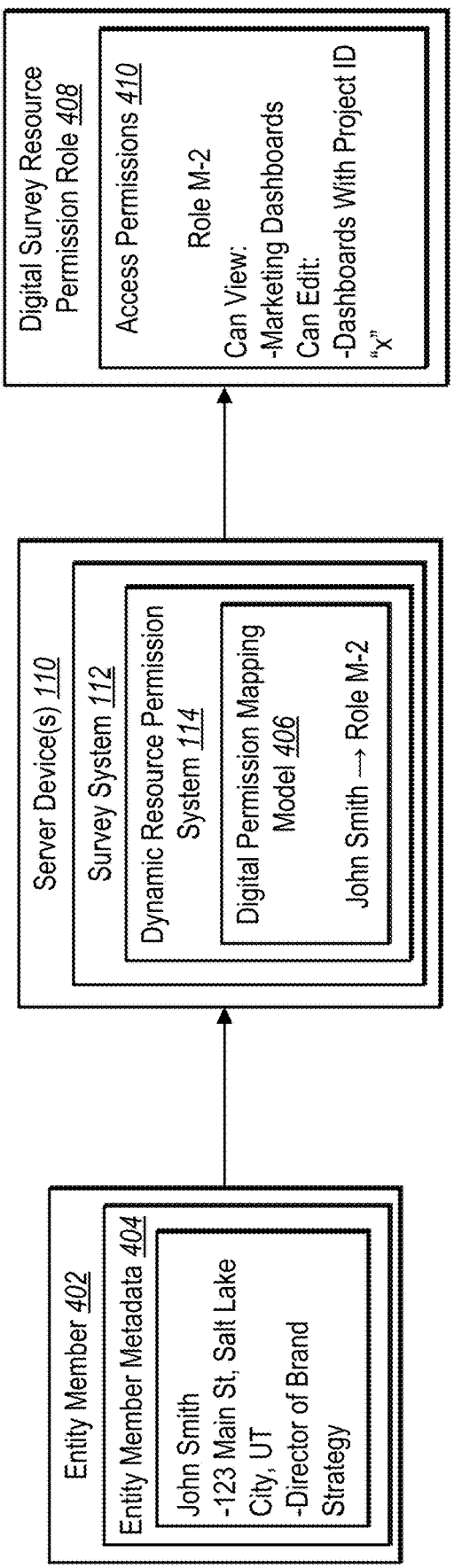
FIG. 4 illustrates automatically mapping an entity member onto a digital survey resource permission role in accordance with one or more embodiments.

As mentioned above, the dynamic resource permissions system 114 can automatically map entity members to digital survey resource permission roles. More specifically, the dynamic resource permissions system 114 can utilize a digital permission mapping model to automatically map the entity members. FIG. 4 illustrates an example process for mapping of an example entity member onto a digital survey resource permission role.

As shown in FIG. 4, an entity member 402 is associated with entity member digital metadata 404. As discussed briefly above, an entity member can include any member of an organization or group. FIG. 4 shows the entity member 402 of "John Smith." In some embodiments, the process of automatically mapping an entity member 402 onto a digital survey resource permission role is triggered by the entity member 402 joining the entity, a change to the entity member digital metadata 404, or other updates to the entity member 402.

As shown in FIG. 4, the entity member digital metadata 404 corresponding to John Smith includes an address of "123 Main St, Salt Lake City, Utah" and a job title of "Director of Brand Strategy." However, as discussed above, entity member digital metadata can include a variety of information corresponding to the entity member 402. As also shown in FIG. 4, the dynamic resource permissions system 114 can receive the entity member digital metadata 404. More specifically, the dynamic resource permissions system 114 can provide the entity member digital metadata 404 to the digital permission mapping model 406.

The dynamic resource permissions system 114 utilizes the digital permission mapping model 406 and the entity member digital metadata 404 to automatically map the entity member 402 onto a digital survey resource permission role. In one or more embodiments, the digital permission mapping model 406 is based on rules defined by the entity or by a third party. For example, as will be discussed below with regard to FIG. 6, the dynamic resource permissions system 114 can provide a graphical user interface that can receive user input defining a digital permission mapping model 406. The dynamic resource permissions system 114 can provide data for the graphical user interface, and accordingly the graphical user interface can be presented by an administrator device or by a third-party device.

The digital permission mapping model 406 can include a variety of computer-implemented models. In one or more embodiments, the digital permission mapping model 406 can be a rules-based or heuristic model. For example, the digital permission mapping model 406 can include a set of rules that indirectly specify a mathematical model. In some embodiments, the digital permission mapping model 406 includes a stochastic model or a translated model.

The dynamic resource permissions system 114 can receive, recognize, and implement a user-defined digital permission mapping model 406. That is, the dynamic resource permissions system 114 can receive user input defining a digital permission mapping model 406 and can generate the digital permission mapping model 406 based on that user input. As discussed above, the dynamic resource permissions system 114 can receive user input corresponding to, and can implement user-definition of, survey resource classes, digital survey resource permission roles, and/or digital survey resources. Similarly, the dynamic resource permissions system 114 can receive user input corresponding to the digital permission mapping model 406 and can implement a digital permission mapping model 406 based on the received user input. To illustrate, the dynamic resource permissions system 114 can receive user input designating certain entity-member metadata as indicative or characteristic of corresponding digital survey resource permission roles.

In embodiments where the digital permission mapping model 406 includes a rules-based model, the dynamic resource permissions system 114 can receive user input designating a wide variety of associations between entity member digital metadata and digital survey resource permission roles. For example, the dynamic resource permissions system 114 can receive user input indicating the city of home or work addresses as indicative of membership at the nearest office to the home or work address. In another example, the dynamic resource permissions system 114 can receive user input associating a particular address with membership in a particular work location. Accordingly, the dynamic resource permissions system 114 can associate home or work addresses with digital survey resource permission roles corresponding to particular work locations.

As shown in FIG. 4, the entity member "John Smith" is associated with the address "123 Main St., Salt Lake City, Utah." Based on user input defining an association between addresses and office locations, the dynamic resource permissions system 114 can include an association between a Salt Lake City address and a Salt Lake City location. Accordingly, the dynamic resource permissions system 114 can utilize the digital permission mapping model 406 to map John Smith onto a digital survey resource permission role corresponding to the Salt Lake City office. In another example, the dynamic resource permissions system 114 can associate some addresses with "corporate" or "general" roles that have access to digital survey resources across all offices. Thus, the dynamic resource permissions system 114 can use the digital permission mapping model 406 and an address to map an entity member onto a "general" or "corporate" digital survey resource permission role that is not associated with any particular geographic location.

For example, the dynamic resource permissions system 114 can determine that entity metadata 402 corresponding to a first user is associated with a Seattle location. Thus, the dynamic resource permissions system 114 can automatically map the first user onto a digital survey resource permission role associated with the Seattle location, and that includes access permissions designating access to Seattle-related digital survey resources. Further, the dynamic resource permissions system 114 can determine that entity metadata 402 corresponding to a second user is associated with a corporate location. Thus, the dynamic resource permissions system 114 can automatically map the second user onto a digital survey resource permission role associated with the corporate location, and that includes access permissions designating access to digital survey resources related to a variety of locations.

In another example, the dynamic resource permissions system 114 can receive user input defining certain job titles as indicative of particular departments or work groups within an entity. Additionally, the dynamic resource permissions system 114 can receive user input indicating an association between job titles and a corresponding access level. Thus, the dynamic resource permissions system 114 can associate job titles as corresponding to digital survey resource permission roles associated with a work group and associated with a particular access level. For example, as shown in FIG. 4, the dynamic resource permissions system 114 can associate the job title "Director of Brand Strategy" with digital survey resource permission role associated with a "level two" marketing digital survey resource permission role. Though the example designates numbers for access levels, it will be appreciated that the dynamic resource permissions system 114 can utilize a variety of access level labelling schemes, including based on user input.

In another example, the dynamic resource permissions system 114 can utilize associations between telephone numbers and work locations, work groups or departments, or a variety of other associations. To illustrate, the digital permission mapping model 406 can utilize associations between an area code and a work location. Additionally, the digital permission mapping model 406 can utilize associations between a particular extension or extension type and an access level or a work department or work group. In turn, the digital permission mapping mode 406 can include associations between the work locations, work groups or departments, and access levels and particular digital survey resource permission roles. Thus, the dynamic resource permissions system 114 can utilize a telephone number within entity member digital metadata 404 to automatically map an entity member 402 onto a digital survey resource permission role.

In yet another example, the dynamic resource permissions system 114 can utilize associations between a work schedule and an access level, employee type, work location, or a variety of other associations. To illustrate, the digital permission mapping model 406 can utilize associations between a work schedule and a part-time or full-time designation, which can be associated with a particular group of digital survey resource permission roles. Additionally, the digital permission mapping model 406 can utilize associations between start times or end times and a particular time zone and/or work locations within that time zone. Thus, the dynamic resource permissions system 114 can utilize a work schedule within entity member digital metadata 404 to automatically map an entity member 402 onto a digital survey resource permission role.

Additionally, the digital permission mapping model 406 can determine a number of years with the entity based on a start date. Further, the digital permission mapping model 406 can associate various numbers of years with the entity with various digital survey resource permission roles, including based on received user input. Thus, the dynamic resource permissions system 114 can utilize a work start date within entity member digital metadata 404 to automatically map an entity member 402 onto a digital survey resource permission role.

Though the above discussion illustrates examples of types of associations, it will be appreciated that the dynamic resource permissions system 114 can generate and utilize a digital permission mapping model 406 based on a variety of types of associations with entity member digital metadata 404. Additionally, though the above description illustrates these associations in conjunction with a rules-based digital permission mapping model 406, the dynamic resource permissions system 114 can utilize such associations built based on a variety of types of the digital permission mapping model 406.

For example, in one or more embodiments, the digital permission mapping model 406 includes a machine-learning model (e.g., a deep learning model). In some embodiments, the digital permission mapping model 406 include a machine learning model, such as linear regression, logistic regression, a decision tree, or a variety of machine learning models. In some embodiments, the digital permission mapping model 406 includes one or more neural networks. The neural network(s) can receive the entity member digital metadata as input and generate the digital survey resource permission role. The neural networks can be any of a variety of types of networks, such as a convolutional neural network, or other appropriate neural network types.

In some embodiments, the dynamic resource permissions system 114 trains the neural network utilizing ground-truth digital survey resource permission roles corresponding to entity members and corresponding entity member digital metadata. More specifically, the digital permission mapping model 406 can analyze an entity member and corresponding entity member digital metadata to determine a predicted digital survey resource permission role. Further, the digital permission mapping model 406 compares the predicted digital survey resource permission role to the ground truth permissions role to update the digital permission mapping model 406 neural network. Thus, the dynamic resource permissions system 114 can train a machine-learning based digital permission mapping model 406 for use with a variety of entity structures. Accordingly, a deep learning-based digital permission mapping model 406 can provide access to survey resources for a variety of entities.

As shown in FIG. 4, the dynamic resource permissions system 114 can recognize and interpret the entity member digital metadata 404 corresponding to John Smith. More specifically, as discussed above, the dynamic resource permissions system 114 utilizes the digital permission mapping mode 406 to determine that the address in the entity member digital metadata indicates membership in the Salt Lake City location. Further, the dynamic resource permissions system 114 utilizes the digital permission mapping mode 406 to determine that the job title "Director of Brand Strategy" indicates a level two marketing position. As discussed above, the dynamic resource permissions system 114 can utilize a digital permission mapping model 406 including rules-based and/or machine-learning-based determinations to make these associations.

The digital permission mapping model 406 can utilize the recognition and interpretation of the metadata to select the appropriate digital survey resource permission role for the entity member 402. As shown in FIG. 4, the digital permission mapping model 406 determines that the entity member 402 should be assigned to the digital survey resource permission role "M-2" based on the entity-member metadata 404 indicating an association with the Salt Lake City location and a level-two marketing position. That is, the dynamic resource permissions system 114 determines, based on the entity member digital metadata 404, to automatically map the entity member 402 to the digital survey resource permission role M-2.

As mentioned above, though the entity member digital metadata 404 includes an address and a job title, it is important to note that the digital permission mapping model 406 can analyze and interpret a variety of types of entity member digital metadata. The digital permission mapping model 406 can then utilize a variety of interpretations of the entity member digital metadata 404 to automatically map an entity member 402 onto a digital survey resource permission role by comparing criteria for digital survey resource permission roles and the analysis of the entity member digital metadata 404. That is, the digital permission mapping model 406 can identify a digital survey resource permission role by identifying the determined entity member features.

As shown in FIG. 4, the dynamic resource permissions system 114 automatically maps the entity member 402 onto the digital survey resource permission role 408. The digital survey resource permission role 408 includes access permissions 410. In FIG. 4, the digital survey resource permission role "Role M-2" includes the access permissions 410 designating that the entity member 402 can view marketing dashboards and can edit dashboards with the project identifier "x."

Additionally, the permissions-based distribution system 116 can automatically update a digital survey resource permission role based on changes to entity metadata. More specifically, the permissions-based distribution system 116 can identify modified metadata corresponding to an entity member. In some embodiments, the permissions-based distribution system 116 identifies the modified metadata by comparing it to metadata utilized to determine the most recent digital survey resource permission role. Upon determining that the metadata is modified, the permissions-based distribution system 116 utilizes the digital permission mapping model 406 to automatically map the entity member to a modified digital survey resource permission role based on the modified metadata. Because the permissions-based distribution system 116 can continuously monitor entity member digital metadata and identify modified metadata as a trigger to update a digital survey resource permission role, the permissions-based distribution system 116 can provide more accurate access to digital survey resources.

As discussed above, the dynamic resource permissions system 114 can map the entity member 402 onto a variety of digital survey resource permission roles 408 based on the entity member digital metadata 404. Additionally, the digital survey resource permission role 408 can include a variety of access permissions 410 reflecting a variety of types of access. That is, while FIG. 4 shows a particular entity member 402 mapped onto a particular digital survey resource permission role 408, it will be understood that the dynamic resource permissions system 114 can map a variety of entity members 402 onto an appropriate digital survey resource permission role 408.

Figure 5:
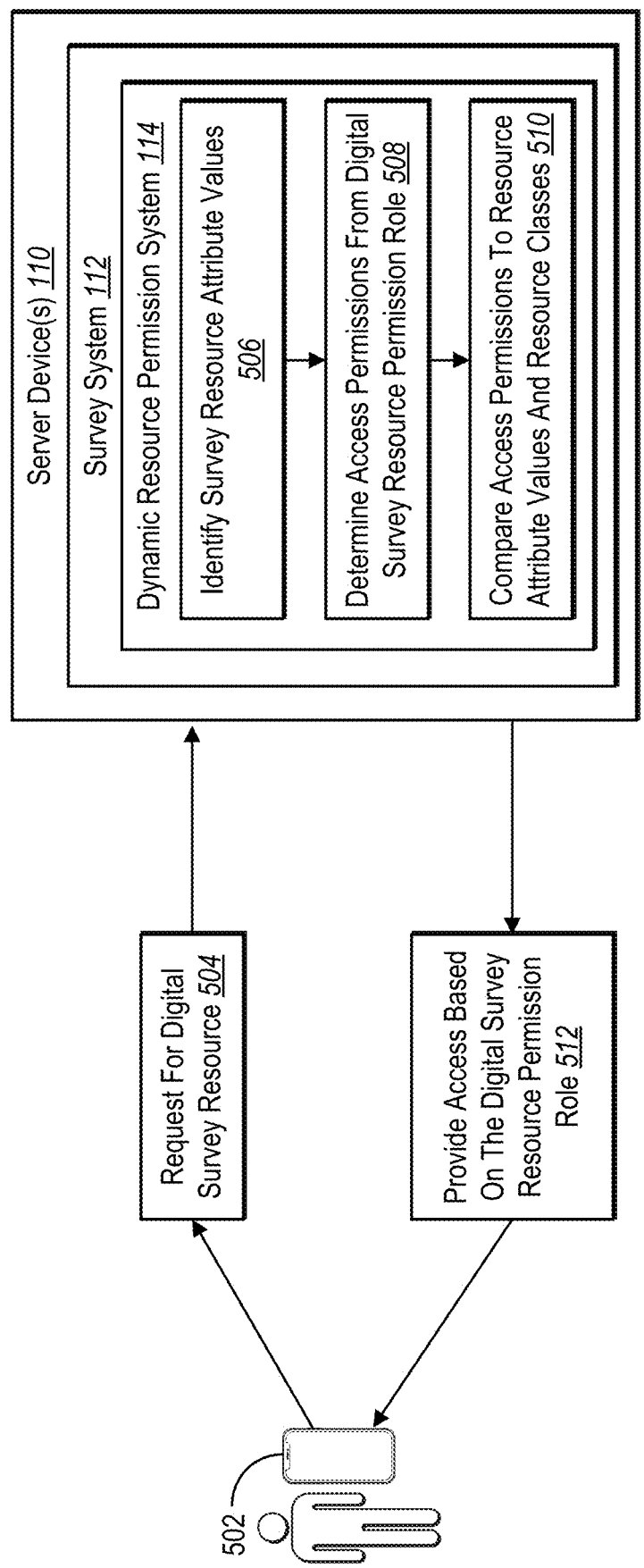
FIG. 5 illustrates responding to a request for a digital survey resource based on a digital survey resource permission role in accordance with one or more embodiments.

The dynamic resource permissions system 114 can manage and provide access to digital survey resources based on a requesting entity member's digital survey resource permission role. FIG. 5 illustrates providing access to digital survey resources based on the digital survey resource permission role of a requesting entity member in accordance with one or more embodiments. More specifically, FIG. 5 illustrates receiving and responding to a request to access a digital survey resource based on a digital survey resource permission role of the requesting entity member.

As shown in FIG. 5, the entity member device 502 submits a request for a digital survey resource 504 to the dynamic resource permissions system 114. The entity member device 502 can be a variety of kinds of entity member device, as explained above with regard to FIG. 1. As shown in FIG. 5, upon receiving the request for the digital survey resource 504, the dynamic resource permissions system 114 can perform an act 506 of identifying survey resource attribute values. More specifically, the dynamic resource permissions system 114 can determine the survey resource attribute values of the requested digital survey resource.

In one or more embodiments, the dynamic resource permissions system 114 utilizes resource identification in combination with the resource definition described above to recognize and identify various attribute values corresponding to the requested digital survey resource. That is, the dynamic resource permissions system 114 can utilize a resource identification algorithm to identify survey resource classes, survey attribute categories, and attribute values defined for an entity.

The dynamic resource permissions system 114 can utilize resource identification to determine a full or partial characteristic of a survey resource. That is, the dynamic resource permissions system 114 can identify an attribute of a survey resource and portions of that attribute. For example, the dynamic resource permissions system 114 can determine that the requested digital survey resource has the location identifier "LAS." The dynamic resource permissions system 114 can also determine that the requested digital survey resource has a dashboard identifier beginning with "4." Thus, the dynamic resource permissions system 114 can provide access to survey resources based on full resource attribute values and/or portions of resource attribute values. Accordingly, the dynamic resource permissions system 114 can implement access permissions defined based on portions of resource attribute values.

Additionally, the dynamic resource permissions system 114 can identify content attributes associated with the content of digital survey resources. Accordingly, the dynamic resource permissions system 114 can implement access permissions including or excluding digital survey resources based on the content of those resources. For example, the dynamic resource permissions system 114 can identify names, dates, or other potentially identifying details from survey responses. Thus, the dynamic resource permissions system 114 can implement access permissions designating access based on identifying information. To illustrate, the dynamic resource permissions system 114 can implement an access permission excluding survey responses having names in them. Thus, the dynamic resource permissions system 114 can prevent entity members with particular digital survey resource permission role from viewing sensitive identifying information.

Additionally, the dynamic resource permissions system 114 can identify sentiment from survey responses. Accordingly, in one or more embodiments, the dynamic resource permissions system 114 implements access permissions based on determined sentiment. In one or more embodiments, the dynamic resource permissions system 114 utilizes sentiment scores and sentiment thresholds to classify digital survey resources with varying degrees of positivity or negativity. For example, the dynamic resource permissions system 114 can implement an access permission excluding access to survey responses or reports including extremely negative sentiment, meaning survey responses or reports with a sentiment score of −50 or lower (or some other sentiment threshold). Utilization of digital survey resource sentiment may be implemented in conjunction with identification of identifying information. To illustrate, in some embodiments, the dynamic resource permissions system 114 implements an access permission that excludes access to digital survey resources including both (1) at least one piece of identifying information, and (2) very negative sentiment.

As further shown in FIG. 5, the dynamic resource permissions system 114 can perform an act 508 of determining access permissions from a digital survey resource permission role. More specifically, the dynamic resource permissions system 114 can determine the digital survey resource permission role corresponding to the requesting entity member associated with the entity member device 502. In one or more embodiments, the dynamic resource permissions system 114 retrieves the digital survey resource permission role from an entity member account associated with the requesting entity member. Upon determining the digital survey resource permission role associated with the requesting entity member, the digital survey resource permission role can determine the access permissions associated with that digital survey resource permission role.

As also shown in FIG. 5, the dynamic resource permissions system 114 can also perform the act 510 of comparing access permissions to resource attribute values and resource classes. More specifically, the dynamic resource permissions system 114 can compare the resource attribute values and resource classes determined in the act 506 and the access permissions identified in the act 510. The dynamic resource permissions system 114 determines whether the access permissions of the digital survey resource permission role comply with the attribute values of the requested digital survey resource.

The dynamic resource permissions system 114 determines whether the identified resource class and survey resource attributes of the requested digital survey resource match the components of an "allowed" digital survey resource under the determined access permissions. As mentioned above, the dynamic resource permissions system 114 can make this determination based on full resource attribute values and/or portions of resource attribute values. To illustrate, the dynamic resource permissions system 114 can identify "matches" between the access permissions and attribute values or portions of attribute values of the requested digital survey resource.

In one or more embodiments, the dynamic resource permissions system 114 utilizes this comparison to determine whether and how to provide access to the requested digital survey resource. As shown in FIG. 5, the dynamic resource permissions system 114 can perform an act 512 of providing access based on the digital survey resource permission role. For example, if the dynamic resource permissions system 114 determines that the digital survey resource permission role corresponding to the requesting entity member grants access to view but not to edit the requested digital survey resource, the dynamic resource permissions system 114 can provide access to a read-only version of the requested digital survey resource.

In one or more embodiments, if the dynamic resource permissions system 114 determines that no access should be granted to the entity member device 502, the dynamic resource permissions system 114 can instead provide a notification to the entity member device 502. For example, the dynamic resource permissions system 114 can provide the notification within a graphical user interface in which the entity member requested to access the digital survey resource. In one or more embodiments, the notification includes the requesting entity member's digital survey resource permission role, an explanation that the requested digital survey resource does not comply with the digital survey resource permission role, and/or other information about the requested digital survey resource.

Figure 6A:
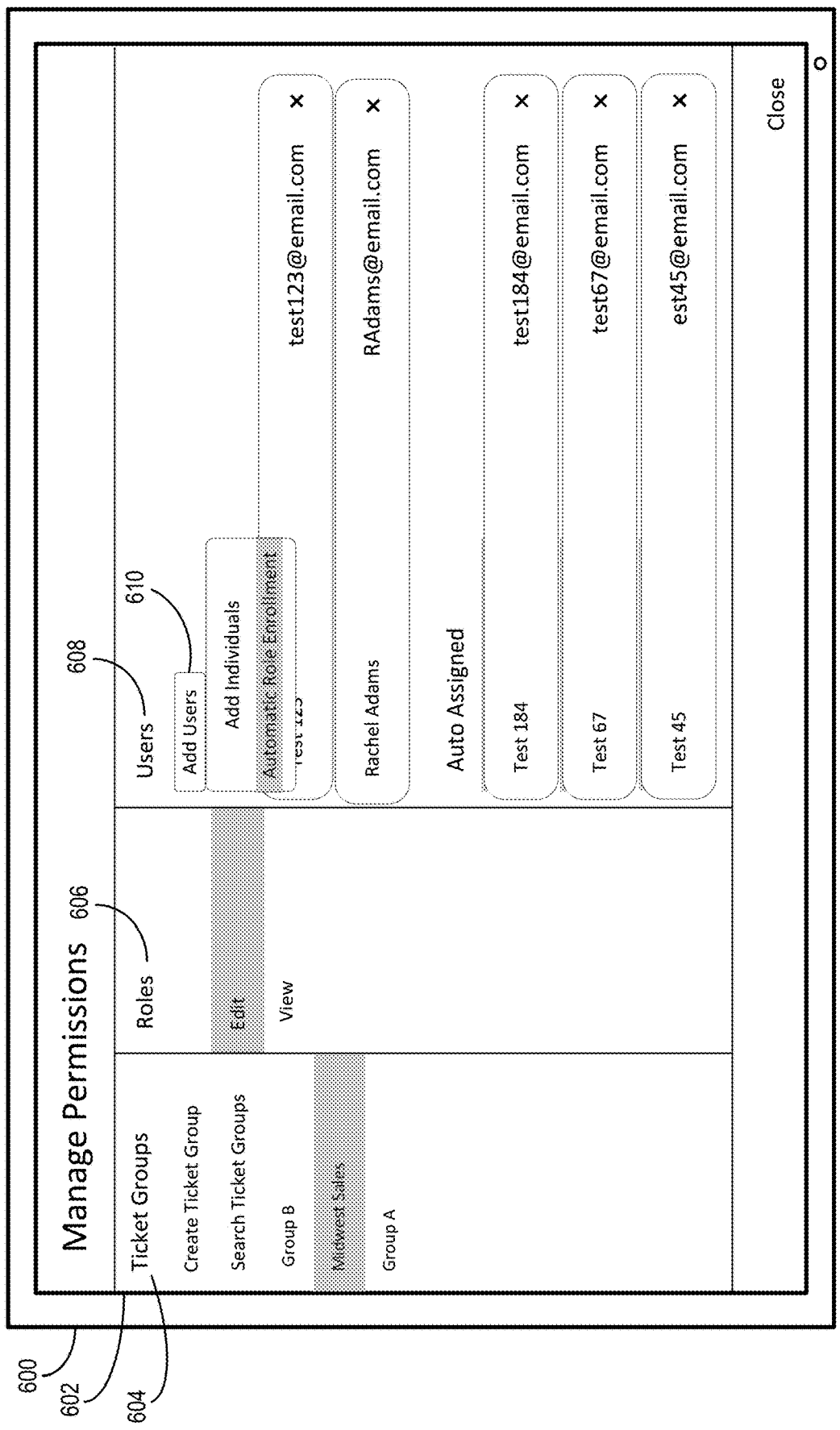
FIGS. 6A-6C illustrate example graphical user interfaces for managing automatic mapping of entity members to digital survey resource permission roles in accordance with one or more embodiments.
Figure 6B:
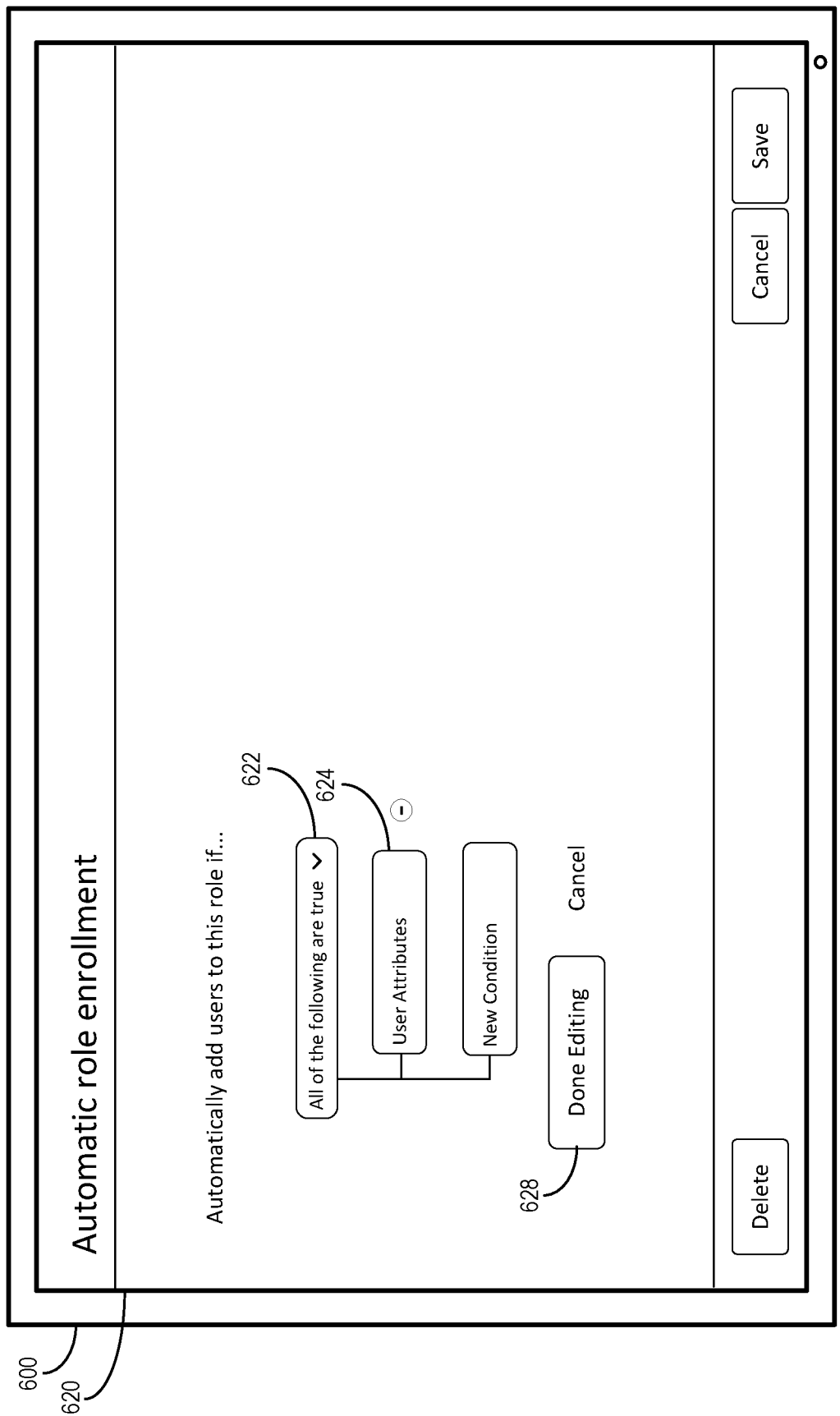
Figure 6C:
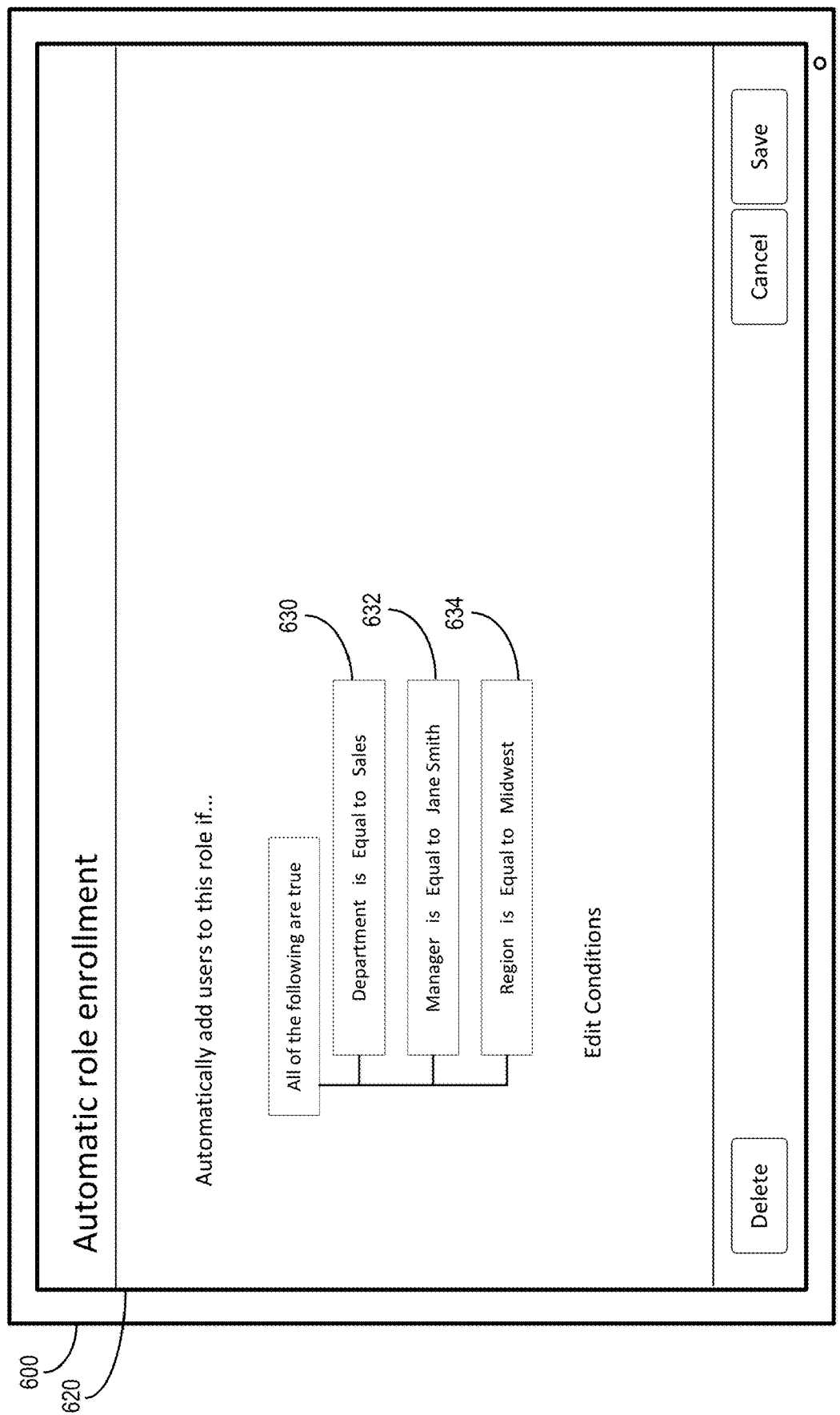

As discussed, the dynamic resource permissions system 114 can provide graphical user interfaces for setting criteria for mapping entity members to digital survey resource permission roles. FIGS. 6A-6C illustrate example graphical user interfaces for administrator selection of these criteria. More specifically, FIGS. 6A-6C illustrate an administrator device 600 presenting a digital survey resource permission role definition graphical user interface 602.

As show in FIG. 6A, the digital survey resource permission role definition graphical user interface 602 includes a listing of a variety users mapped or assigned to digital survey resource permission roles. More specifically, the digital survey resource permission role definition graphical user interface 602 includes a digital survey resource permission role listing 604. As shown in FIG. 6A, the digital survey resource permission role listing 604 includes the text "Ticket Groups" and a listing of digital survey resource permission roles. Though FIG. 6A illustrates the term "Ticket Groups," the dynamic resource permissions system 114 can provide a listing of a variety of kinds of digital survey resource permission roles for accessing a variety of kinds of digital survey resources.

Additionally, as shown in FIG. 6A, the digital survey resource permission role listing 604 includes the digital survey resource permission roles "Group B," "Midwest Sales," and "Group A." Each of these labels reflects a unique survey resource permission role generated by the dynamic resource permission system 114. Although FIG. 6A illustrates a specific set of survey resource permission rules, the dynamic resource permissions system 114 can generate the digital survey resource permission role listing 604 to include a variety of digital survey resource permission roles. More specifically, the dynamic resource permissions system 114 can identify each digital survey resource permission role available to the administrator device 600 for viewing and/or editing.

Further, the digital survey resource permission role definition graphical user interface 602 includes an access column 606. As shown in FIG. 6A, the access column 606 includes options as to whether to view or edit the selected digital survey resource permission role. For example, FIG. 6A illustrates both viewing and editing available to the administrator device 600 for the selected digital survey resource permission role "Midwest Sales." However, the dynamic resource permissions system 114 can provide options for each digital survey resource permission role based on appropriate access for the administrator device 600.

The digital survey resource permission role definition graphical user interface 602 also includes a user listing 608. The users listing 608 includes the users automatically mapped or manually assigned to the selected digital survey resource permission role. FIG. 6A illustrates users assigned to the selected "Midwest Sales" digital survey resource permission role. Further, the users listing 608 is divided into users that were added manually and user that were automatically mapped onto the digital survey resource permission role.

The dynamic resource permissions system 114 can identify each user included in a selected digital survey resource permission role. Further, the dynamic resource permissions system 114 can identify whether a user was manually assigned to the digital survey resource permission role or automatically mapped onto the digital survey resource permission role. Then, the dynamic resource permissions system 114 can generate the users listing 608 with the users organized to reflect their corresponding method of assignment to the digital survey resource permission role.

Additionally, as shown in FIG. 6A, the digital survey resource permission role definition graphical user interface 602 includes an add users menu 610. The add users menu 610 includes an option to manually add users to the selected digital survey resource permission role. Further, the add users menu 610 includes an option to modify the criteria for automatically mapping users onto the digital survey resource permission role. As shown in FIG. 6A, these options are titled "Add individuals," and "Automatic role enrollment," respectively. However, the dynamic resource permissions system 114 can generate the add users menu 610 in accordance with a variety of titles reflecting these editing options.

In response to receiving user input at the option for adding users manually to the digital survey resource permission role, the dynamic resource permissions system 114 can provide, in the digital survey resource permission role definition graphical user interface 602, options for manual entry of users. For example, the dynamic resource permissions system 114 can provide a text box for receiving user identifiers of users for addition to the digital survey resource permission role. Based on receiving administrator selection of users for addition to the digital survey resource permission role, the dynamic resource permissions system 114 can assign the selected users to the digital survey resource permission role. Accordingly, the dynamic resource permissions system 114 can provide the manually assigned users with access permissions corresponding to the digital survey resource permission role.

In response to receiving user input at the option for modifying the criteria for automatically mapping users onto the digital survey resource permission role, the dynamic resource permissions system 114 can provide options for modification in the digital survey resource permission role. More specifically, as shown in FIGS. 6B-6C, the dynamic resource permissions system 114 can provide a digital survey resource permission role criteria graphical user interface 620. More specifically, FIG. 6B-6C illustrate the digital survey resource permission role criteria graphical user interface 620 corresponding to the digital survey resource permission role "Midwest Sales."

As shown in FIG. 6B, the digital survey resource permission role criteria graphical user interface 620 includes an automatic mapping selection element 622. The automatic mapping selection element 622 includes selectable options for criteria for automatic mapping to the digital survey resource permission role. For example, as shown in FIG. 6B, the automatic mapping selection element 622 includes the criteria "All of the following are true." To illustrate, the dynamic resource permissions system 114 will automatically map a user to the digital survey resource permission role if the user has each of the below included user attributes. However, the automatic mapping selection element 622 can also include selectable options for a variety of other criteria, such as at least one of the following is true, at least half of the following are true, at least all but one of the following are true, etc.

Further, the digital survey resource permission role criteria graphical user interface 620 includes a user attribute selection element 624. As shown in FIG. 6B, the user attribute selection element 624 includes a drop down menu for selection of user attributes for automatic mapping to the digital survey resource permission role. As shown in greater detail below with regard to FIG. 6C, the user attribute selection element 624 can include options for a variety of attribute types. Though FIG. 6B illustrates the user attribute selection element 624 as a drop-down menu, the dynamic resource permissions system 114 can generate the user attribute selection element 624 to receive a variety of types of user input.

Further, as shown in FIG. 6B, the digital survey resource permission role criteria graphical user interface 620 includes a submit button 628. In response to receiving administrator input at the user attribute selection element 624, the dynamic resource permissions system 114 can update the criteria for automatic assignment to the digital survey resource permission role. FIG. 6B illustrates the user attribute selection element 624 including the text "Done Editing." However, the dynamic resource permissions system 114 can generate the user attribute selection element 624 to include a variety of text reflecting submission of the selected criteria and/or user attributes (e.g. "Submit," "OK," "Finished," etc.).

As shown in FIG. 6C, the dynamic resource permissions system 114 can receive and utilize a variety of user attributes for automatically mapping a user onto a digital survey resource permission role. As mentioned above, FIGS. 6B-6C illustrate the digital survey resource permission role criteria graphical user interface 620 corresponding to the example digital survey resource permission role "Midwest Sales." FIG. 6C illustrates user attributes 630, 632, 634 corresponding to the digital survey resource permission role "Midwest Sales." As discussed in greater detail above, the dynamic resource permissions system 114 can utilize digital metadata corresponding to a user to determine whether a user satisfies or matches various user attributes.

Based on receiving user input at the user attribute selection element 624, the dynamic resource permissions system 114 can provide a variety of selectable options corresponding to possible user attributes. For example, the user attribute 630 corresponds to a "Department," the user attribute 632 corresponds to a "Manager," and the user attribute 634 corresponds to a "Region." Further, based on receiving administrator selection of a user attribute, the dynamic resource permissions system 114 can provide a variety of selectable options corresponding to user attribute values for the selected user attribute. For example, the user attribute 630 further includes the user attribute value "Sales," the user attribute 632 further includes the user attribute value "Jane Smith," and the user attribute 634 further includes the user attribute value "Midwest."

The user attribute 630 includes the text "Department is Equal to sales." To illustrate, the dynamic resource permissions system 114 can determine that a user is a member of a sales department based on digital metadata corresponding to the user. Further, the dynamic resource permissions system 114 can identify and determine whether the user is a member of a variety of departments, teams, and/or other groups.

Additionally, the user attribute 632 includes the text "Manager is Equal to Jane Smith." The dynamic resource permissions system 114 can also determine a manager corresponding to a user based on digital metadata corresponding to the user. The dynamic resource permissions system 114 can also identify and determine a variety of other users and/or individuals corresponding to the user. For example, the dynamic resource permissions system 114 can identify coworkers, supervisees, or other individuals corresponding to the user.

Further, the user attribute 634 includes the text "Region is Equal to Midwest." As discussed in greater detail above, the dynamic resource permissions system 114 can determine a region corresponding to a user based on digital metadata corresponding to the user. For example, as discussed above, the dynamic resource permissions system 114 can identify a region corresponding to a user based on an address or phone number area code. The dynamic resource permissions system 114 can further identify an office, sub-region, or other geographical designation corresponding to a user.

Figure 7A:
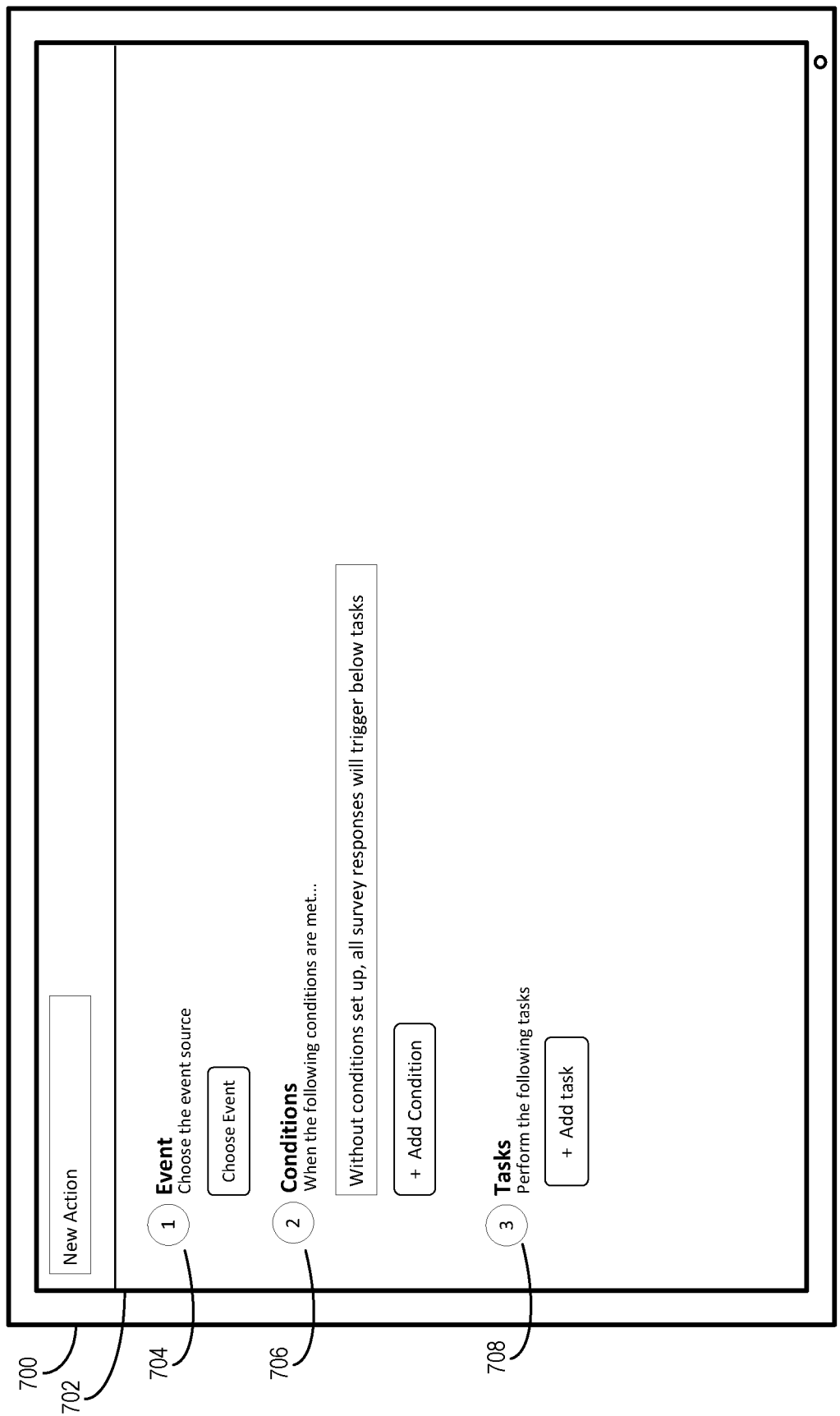
FIGS. 7A-7C illustrate example graphical user interfaces for defining survey resource classes in accordance with one or more embodiments.
Figure 7B:
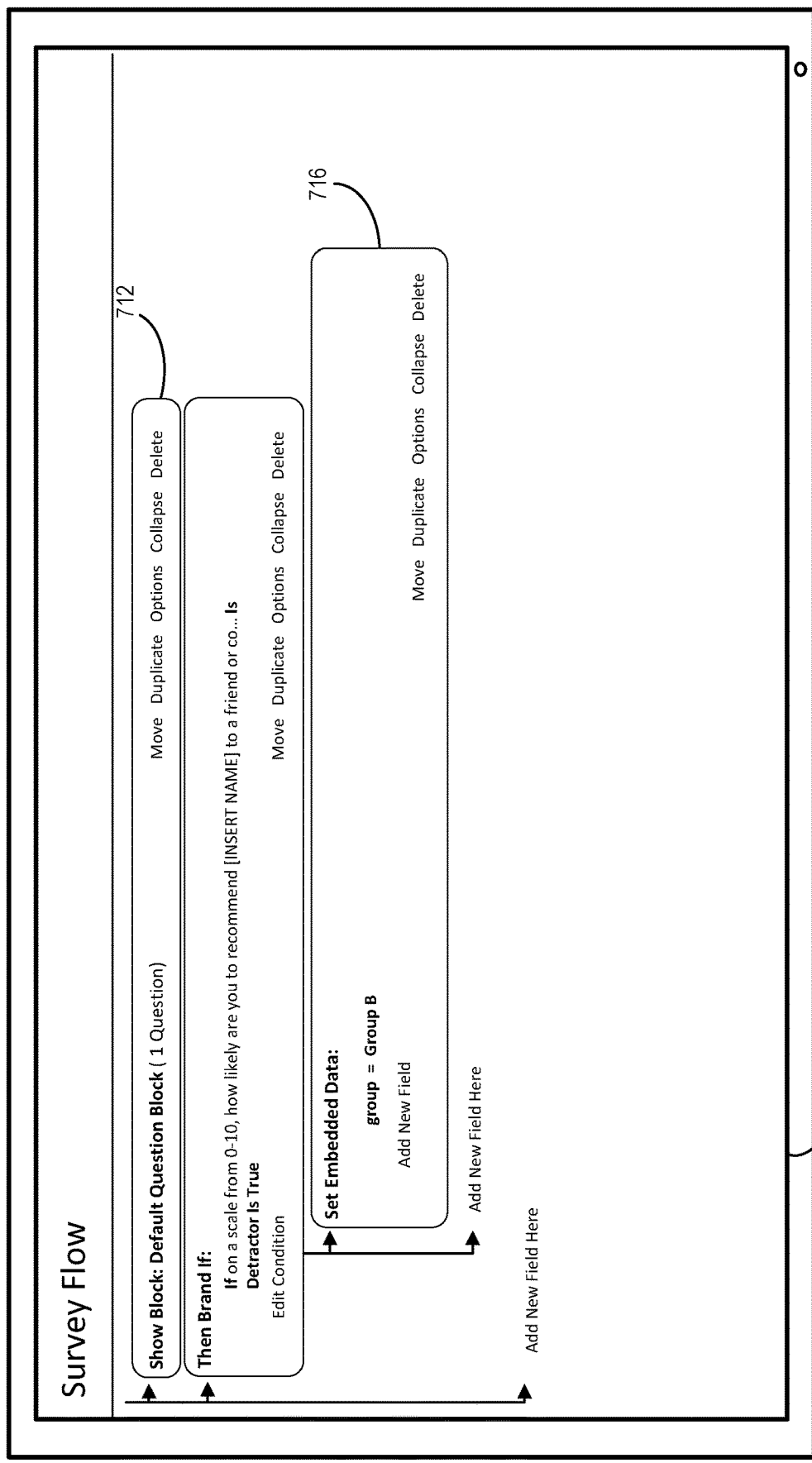
Figure 7C:
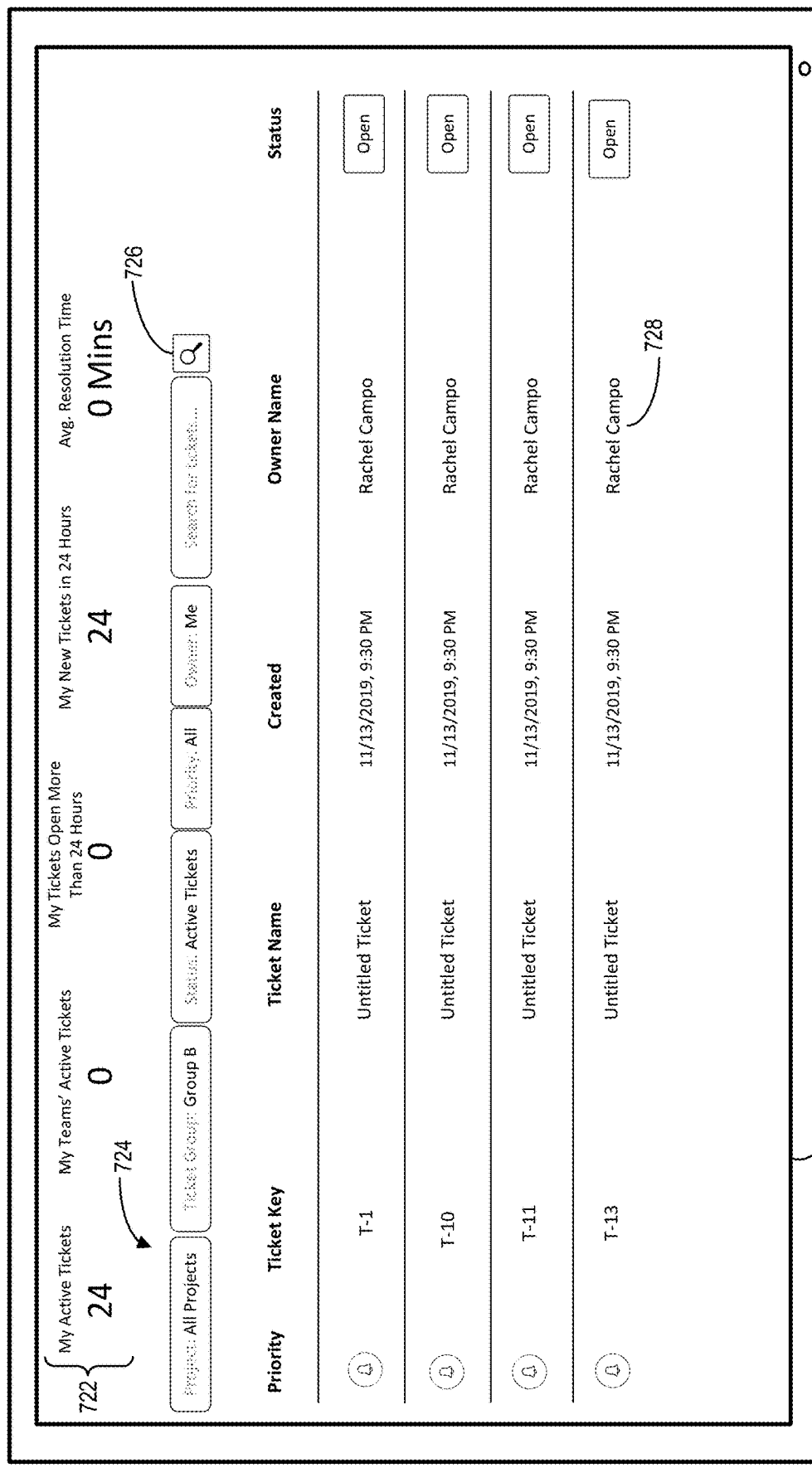

Further, the dynamic resource permissions system 114 can provide graphical user interfaces for setting criteria for categorization or definition of digital survey resources. As shown in FIGS. 7A-7C, the dynamic resource permissions system 114 can provide graphical user interfaces for defining survey resource classes. More specifically, FIGS. 7A-7C illustrate an administrator device 700 presenting various graphical user interfaces for management of digital survey resource classes and other categorization of digital survey resources.

FIG. 7A illustrates a survey resource action definition user interface 702. In some embodiments, the dynamic resource permissions system 114 automatically assigns attribute values to survey resources based on a variety of criteria. For example, FIG. 7A illustrates a graphical user interface for designating a survey resource, designating a condition, and designating an action to take upon satisfaction of the condition. Specifically, in FIG. 7A, the graphical user interface can designate a new digital survey resource to generate with particular attribute values upon satisfaction of the condition.

As shown in FIG. 7A, the survey resource action definition user interface 702 includes a survey resource definition element 704. Based on receiving selection of a survey resource class at the survey resource definition element 704, the dynamic resource permissions system 114 can designate a survey resource class. FIG. 7A illustrates the survey resource definition element 704 with the text "Choose Event."

In one or more embodiments, based on receiving administrator input at the survey resource definition element 704, the dynamic resource permissions system 114 can provide a listing of survey resources for selection. Based on selection of a digital survey resource, the dynamic resource permissions system 114 can generate criteria for one or more actions to take based on designated criteria. For example, the dynamic resource permissions system 114 can receive selection of a digital survey. Further, the dynamic resource permissions system 114 can designate action(s) for digital survey responses corresponding to the digital survey.

Additionally, in some embodiments, the survey resource definition element 704 is a survey resource class definition element. In these embodiments, based on receiving administrator input at the survey resource definition element 704, the dynamic resource permissions system 114 can provide a survey resource class definition user interface. The survey resource class definition user interface can include a listing of existing digital survey resource classes for selection. Additionally, the dynamic resource permissions system 114 can provide an option to generate a new digital survey resource class based on selection of one or more survey attribute categories defining the new digital survey resource class. More specifically, the dynamic resource permissions system 114 can define digital survey resource classes based on received administrator interaction with survey attribute category definition elements. For example, the dynamic resource permissions system 114 can define a digital survey resource class based on selected digital survey resource classes.

Further, as shown in FIG. 7A, the survey resource action definition user interface 702 includes a conditions definition element 706. As will be discussed in greater detail below with regard to FIG. 7B, based on receiving selection of the conditions definition element 706, the dynamic resource permissions system 114 can provide a conditions graphical user interface. The dynamic resource permissions system 114 can accordingly receive administrator input defining one or more conditions for application of a survey resource attribute.

Additionally, as shown in FIG. 7A, the survey resource action definition user interface 702 includes an action definition element 708. In response to receiving administrator selection of an action at the action definition element 708, the dynamic resource permissions system 114 can designate the selected action to perform for selected digital survey resources satisfying the selected condition. Thus, because the dynamic resource permissions system 114 can provide access to digital survey resources based on attribute values relative to digital survey resource permission roles, the dynamic resource permissions system 114 can provide access to digital survey resources based on the applied attribute value.

For example, the dynamic resource permissions system 114 can receive selection of an action to generate an additional digital survey resource. Thus, based on identifying a digital survey response satisfying the condition, the dynamic resource permissions system 114 can generate an additional digital survey resource. In this example, the dynamic resource permissions system 114 can generate a digital survey ticket (e.g. a tagged or labelled portion of a digital survey response). Further, the dynamic resource permissions system 114 can apply an attribute definition to the generated digital survey resource.

In one or more embodiments, the dynamic resource permissions system 114 can receive actions corresponding to the criteria in separate graphical user interfaces. For example, the dynamic resource permissions system 114 can receive the action of generating an additional digital survey resource at the survey resource action definition user interface 702 and receive the action of applying an attribute value at an alternate graphical user interface. In some embodiments, the dynamic resource permissions system 114 can automatically provide graphical user interfaces for defining various actions in response to receiving administrator input at the action definition element 708.

In addition to generating a new digital survey resource and/or applying an attribute value to a digital survey resource, the dynamic resource permissions system 114 can designate and perform a variety of actions. For example, the dynamic resource permissions system 114 can automatically generate a new attribute value and apply it to a digital survey response based on receiving a digital survey response including new content and/or a new combination of content. Additionally, in one or more embodiments, the dynamic resource permissions system 114 can automatically provide a notification to an administrator device and/or to an entity member device based on identifying a digital survey resource satisfying designated criteria.

In addition to applying attribute values, the dynamic resource permissions system 114 can assign survey resources to various groupings. Accordingly, as will be discussed below with regard to FIG. 7C, the dynamic resource permissions system 114 can organize digital survey resources based on the assigned groups and/or attribute values. Thus, the dynamic resource permissions system 114 can filter and provide digital survey resources based on the administrator selections at the survey resource action definition user interface 702.

As mentioned above, the dynamic resource permissions system 114 can provide a conditions graphical user interface for selection of conditions for application of an attribute value. FIG. 7B illustrates a conditions graphical user interface 710 for selection of conditions corresponding to a digital survey response. More specifically, the conditions graphical user interface 710 includes a question designation element 712. As shown in FIG. 7B, the selected question is question one. However, the dynamic resource permissions system 114 can receive administrator input designating any of a variety of questions and/or question types for a condition.

Further, as shown in FIG. 7B, the conditions graphical user interface 710 includes a condition definition element 716. Based on receiving administrator selection of a condition at the condition definition element 716, the dynamic resource permissions system 114 can determine criteria for application of the attribute value. As shown in FIG. 7B, the condition for the survey response is "Detractor Is True." For example, if the survey response includes a rating of 3 or less, the dynamic resource permissions system 114 can determine that "detractor" is true for the survey response. As mentioned above, based on determining that "detractor" is true, the dynamic resource permissions system 114 can automatically generate a digital survey ticket corresponding to the digital survey response (and/or add an attribute value of "detractor" to the digital survey ticket).

However, the dynamic resource permissions system 114 can determine a variety of conditions for a survey resource. Indeed, the dynamic resource permissions system 114 can utilize a condition designating a variety of content of digital survey responses. For example, the dynamic resource permissions system 114 can identify a particular multiple choice response, a keyword in a text response, and a variety of additional resource qualities.

Additionally, the conditions graphical user interface 710 includes an assignment definition element 718. Based on receiving administrator selection of an assignment, the dynamic resource permissions system 114 can determine an attribute value to apply to survey resources based on the selected criteria. In FIG. 7B, the assignment definition element 718 designates "group=Group B." Thus, the assignment definition element 718 shows a selection of the attribute value Group B for the attribute category groups. Thus, as shown in FIG. 7B, based on identifying that detractor is true for a survey response the dynamic resource permissions system 114 can generate a digital survey ticket and apply the attribute value Group B to the generated digital survey ticket. Additionally or in the alternative, the dynamic resource permissions system 114 can apply the attribute value Group B to the digital survey response itself. In some embodiments, the attribute value Group B is accessible to a digital survey resource permission role "Group B." Thus, the dynamic resource permissions system 114 can apply an attribute value designating access to a particular digital survey resource permission role.

In one or more embodiments, the dynamic resource permissions system 114 can also apply an attribute value "detractor" to survey responses based on determining that a survey response includes a rating of 3 or less. More specifically, the in addition or in the alternative to applying "Group B," the dynamic resource permissions system 114 can utilize "rating of 3 or less" or "detractor" as a survey attribute. Further, the dynamic resource permissions system 114 can define a digital survey resource permission role including access to survey resources with the survey attribute "rating of 3 or less" or "detractor." Thus, the dynamic resource permissions system 114 can apply an attribute value with the flexibility to give access to a variety of digital survey resource permission roles.

As mentioned above, the dynamic resource permissions system 114 can provide survey resources based on applied attribute values. FIG. 7C illustrates a survey resource graphical user interface 720. The survey resource graphical user interface 720 includes a variety of survey resources and a variety of options for filtering and organization of the survey resources. In FIG. 7C, the survey resource graphical user interface 720 includes "tickets" or particular survey responses. However, the survey resource graphical user interface 720 can include any of a variety of types of digital survey resources.

As shown in FIG. 7C, the survey resource graphical user interface 720 includes the digital survey response information bar 722. In FIG. 7C, the digital survey response information bar 722 includes the text "My active tickets, 24," "My teams' active tickets, 0," "My tickets open more than 24 hours, 0," "My new tickets in 24 hours, 24," and "Avg. resolution time, 0 minutes." In some embodiments, the dynamic resource permissions system 114 compares the digital survey resource permission roles of a user to the survey attribute values of various survey resources. Upon identifying a match, the system surfaces these tickets to the survey resource graphical user interface 720. For instance, after identifying a survey response of less than 3, the dynamic resource permissions system 114 can determine that the survey response satisfied the condition. Accordingly, the dynamic resource permissions system 114 can generate a ticket with a survey attribute value of Group B. The system can determine that this user corresponds to group B and add the ticket to the survey resource graphical user interface 720.

As described above, the dynamic resource permissions system 114 can identify a variety of attributes and information regarding survey resources. Accordingly, the dynamic resource permissions system 114 can generate the digital survey response information bar 722 based on a variety of information corresponding to survey resources accessible to the administrator device 700.

Further, the survey resource graphical user interface 720 includes filtering options 724. As shown in FIG. 7, the filtering options 724 show selection of survey responses corresponding to "Group B." As also shown in FIG. 7, the filtering options 724 can include a variety of filtering criteria, such as by project, status, priority, owner, etc. Accordingly, the dynamic resource permissions system 114 can provide survey resources corresponding to a variety of criteria types, attribute definitions, etc.

Further, the survey resource graphical user interface 720 includes a search bar 726. The dynamic resource permissions system 114 can utilize administrator input received at the search bar 726 as search terms for a search query of survey responses. For example, the dynamic resource permissions system 114 can perform a variety of kinds of search, such as a keyword search, subject search, semantic search, etc. The dynamic resource permissions system 114 can search content of digital survey responses, metadata associated with survey resources, and a variety of other content associated with survey resources.

Additionally, the survey resource graphical user interface 720 includes the survey resource area 728. The dynamic resource permissions system 114 can determine survey resources to include based on the filtering options 724 and search queries received at the search bar 726. For example, as shown in FIG. 7C, based on receiving selection of "Group B" in the filtering options 724, the dynamic resource permissions system 114 provides survey responses corresponding to "Group B." However, as discussed above, the dynamic resource permissions system 114 can identify a variety of criteria, including attribute classes and attribute values, corresponding to survey resources.

Figure 8:
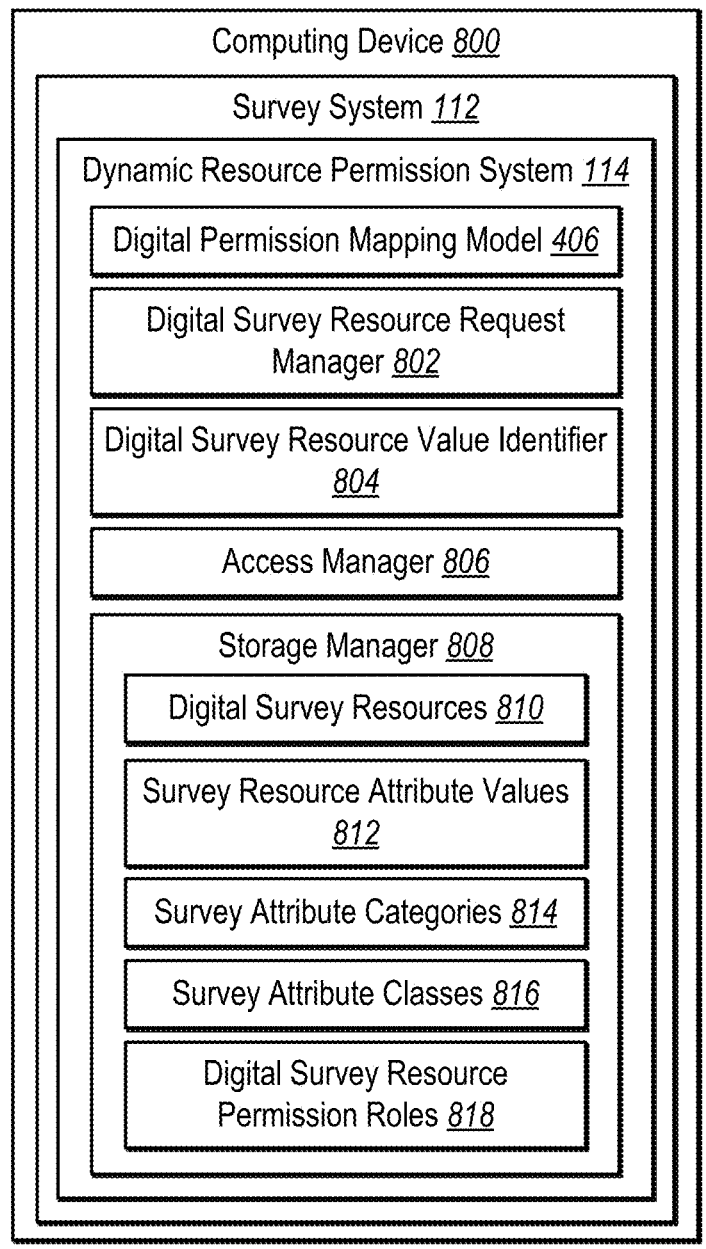
FIG. 8 illustrates a schematic diagram of a dynamic resource permissions system in accordance with one or more embodiments.

Turning now to FIG. 8, this figure provides additional detail regarding components and features of a contextual translation system. In particular, FIG. 8 illustrates a computing device 800 implementing the data analytics system and the dynamic resource permissions system 114. The computing device 1300 can include one or more servers (e.g., the server device(s) 110) and/or one or more client devices (e.g., the user device(s) 116, the administrator device 106). As shown in FIG. 8, the computing device 800 includes the digital permission mapping model 406, a digital survey resource request manager 802, digital survey resource value identifier 804, access manager 806, and storage manager 808. The following paragraphs describe each of these components.

As just mentioned, the computing device 800 can include the digital permission mapping model 406. As discussed above, the digital permission mapping model 406 can automatically map entity members onto digital survey resource permission roles based on digital metadata. The digital permission mapping model 406 can be rules-based and/or machine-learning based. Further, the digital permission mapping model 406 can utilize a variety of kinds of digital metadata.

As shown in FIG. 8, the computing device 800 can further include the digital survey resource request manager 802. The digital survey resource request manager 802 can determine that the dynamic resource permissions system 114 has received a request to access a digital survey resource. Additionally, the digital survey resource request manager 802 can identify an entity member or another user associated with the request to access the digital survey resource. Further, the digital survey resource request manager 802 can identify one or more digital survey resource permission roles associated with a requesting user.

As further shown in FIG. 8, the computing device 800 can further include the digital survey resource value identifier 804. The digital survey resource value identifier 804 can identify resource classes, survey attribute categories, and attribute values corresponding to digital survey resources, including requested digital survey resources. Additionally, the digital survey resource value identifier 804 can recognize and identify entity and/or user-defined resource classes, survey attribute categories, and attribute values.

Additionally, as shown in FIG. 8, the computing device 800 can include the access manager 806. The access manager 806 can compare access permissions associated with a requesting user with the resource classes, survey attribute categories, and attribute values corresponding requested digital survey resources. Further, the access manager 806 can determine whether to grant access to a digital survey resource based on a digital survey resource permission role associated with the requesting user. The access manager 806 can also determine the type of access to grant to the requesting user (e.g. viewing, editing, or sharing).

The computing device 800 can also include the storage manager 808. The storage manager 808 stores and accesses files, indicators, and other data for the dynamic resource permissions system 114 and/or for the survey system 112. For example, the storage manager 808 can communicate with any of the components of the computing device 800 in order to store a variety of data types for the dynamic resource permissions system 114. Further, as shown in FIG. 8, the storage manager 808 includes digital survey resources 810, survey resource attribute values 812, survey attribute categories 814, survey attribute classes 816, and digital survey resource permission roles 818.

Each of the components 802-818 of the dynamic resource permissions system 114 can include software, hardware, or both. For example, the components 802-818 can include one or more instructions stored on a computer-readable storage medium and executable by processors of one or more computing devices, such as a client device or server device. When executed by the one or more processors, the computer-executable instructions of the dynamic resource permissions system 114 can cause the computing device(s) to perform the methods described herein. Alternatively, the components 802-818 can include hardware, such as a special-purpose processing device to perform a certain function or group of functions. Alternatively, the components 802-818 of the dynamic resource permissions system 114 can include a combination of computer-executable instructions and hardware.

Furthermore, the components 802-818 of the dynamic resource permissions system 114 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-818 may be implemented as a stand-alone application, such as a desktop or mobile application. Furthermore, the components 802-818 may be implemented as one or more web-based applications hosted on a remote server. The components 802-818 may also be implemented in a suite of mobile device applications or "apps."

Figure 9:
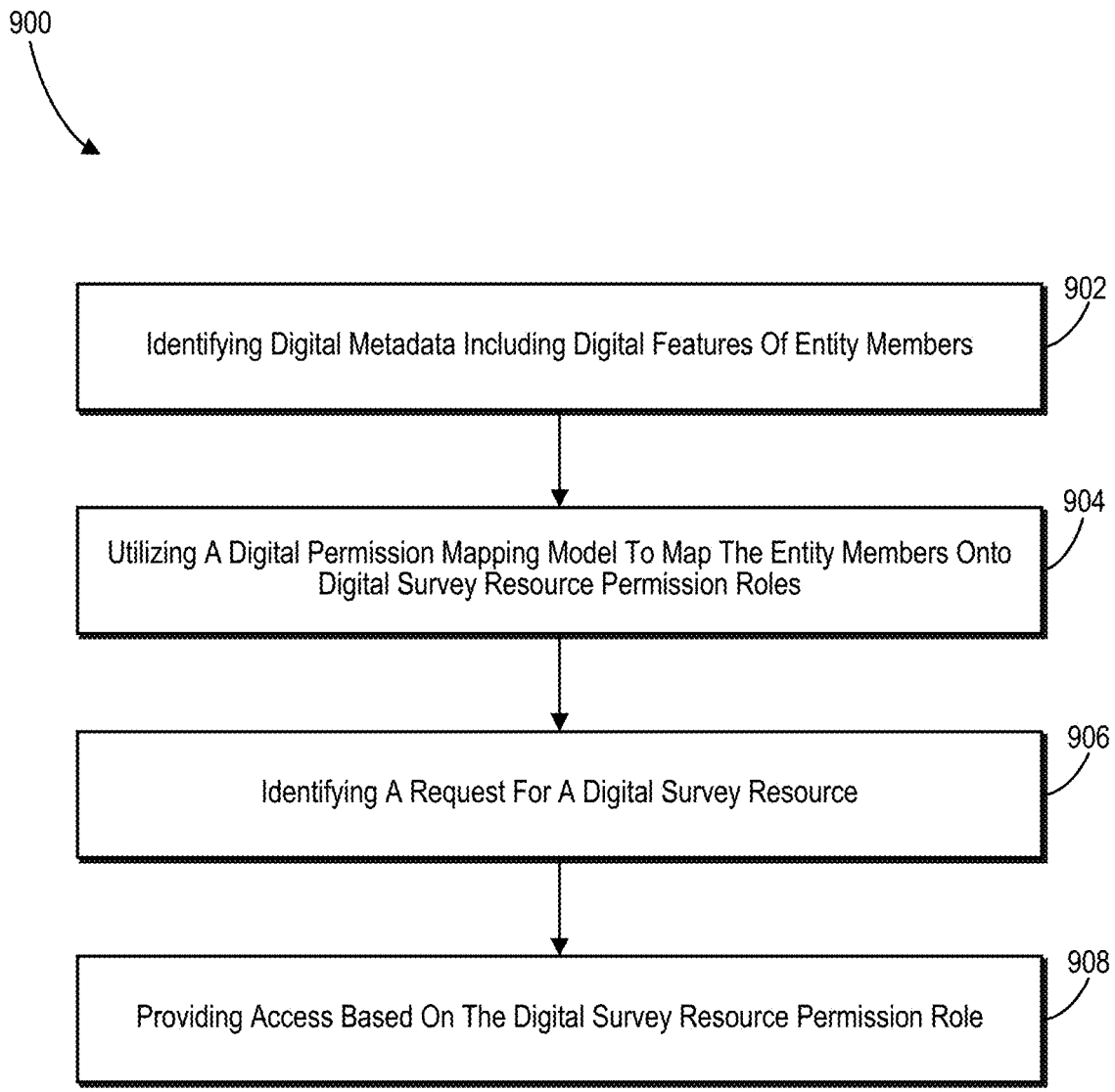
FIG. 9 illustrates a flowchart of a series of acts for providing access to digital survey resources based on digital survey resource permission roles in accordance with one or more embodiments.

FIGS. 1-8, the corresponding text, and the examples provide a number of different methods, systems, devices, and non-transitory computer-readable media of the dynamic resource permissions system 114. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for providing access to digital survey resources based on digital survey resource permission roles in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 for identifying digital metadata including digital features of entity members. In particular, the act 902 can include identifying digital metadata comprising digital features of a plurality of entity members via one or more administrator devices corresponding to an entity.

Further, as shown in FIG. 9, the series of acts 900 includes an act 904 for utilizing a digital permission mapping model to map entity members onto digital survey resource permission roles. In particular, the act 904 can include utilizing a digital permission mapping model to automatically map the plurality of entity members to a plurality of digital survey resource permission roles based on the digital metadata.

Additionally, as shown in FIG. 9, the series of acts 900 includes an act 906 for identifying a request for a digital survey resource. In particular, the act 906 can include identifying a request for a digital survey resource from a client device of an entity member.

Further, as shown in FIG. 9, the series of acts 900 includes an act 908 for providing access based on the digital survey resource permission role. In particular, the act 908 can include providing access to the digital survey resource based on a digital survey resource permission role of the entity member from the plurality of digital survey resource permissions roles. Specifically, the act 908 can include wherein the digital survey resource permission role comprises access permissions for a survey resource class and a corresponding attribute value. Additionally, in one or more embodiments, the act 908 includes comparing the survey resource class and the corresponding attribute value of the access permissions to attribute values of the digital survey resource.

Further, the act 908 can include identifying modified metadata corresponding to the entity member and utilizing the digital permission mapping model to automatically map the entity member to a modified digital survey resource permission role based on the modified metadata. The act 908 can also include identifying an additional request for an additional digital survey resource from one or more client devices of the entity member and limiting access to the digital survey resource based on the modified digital survey resource permission role of the entity member.

In one or more embodiments, the series of acts 900 can also include providing, for display, a survey resource class definition user interface comprising a survey resource class definition element and a survey attribute category definition element. Additionally, the series of acts 900 can include generating a survey resource class comprising a survey attribute category based on user interaction with the resource class definition element and the survey category definition element. The series of acts 900 may also include generating the digital survey resource by defining an attribute value of the digital survey resource corresponding to the survey attribute category.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM (Random-Access Memory), ROM (Read-Only Memory), EEPROM (Electronically Erasable Programmable Read-Only Memory), CD-ROM (Compact Disc Read Only memory), solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs (Personal Computers), minicomputers, mainframe computers, mobile telephones, PDAs (Personal Digital Assistants), tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
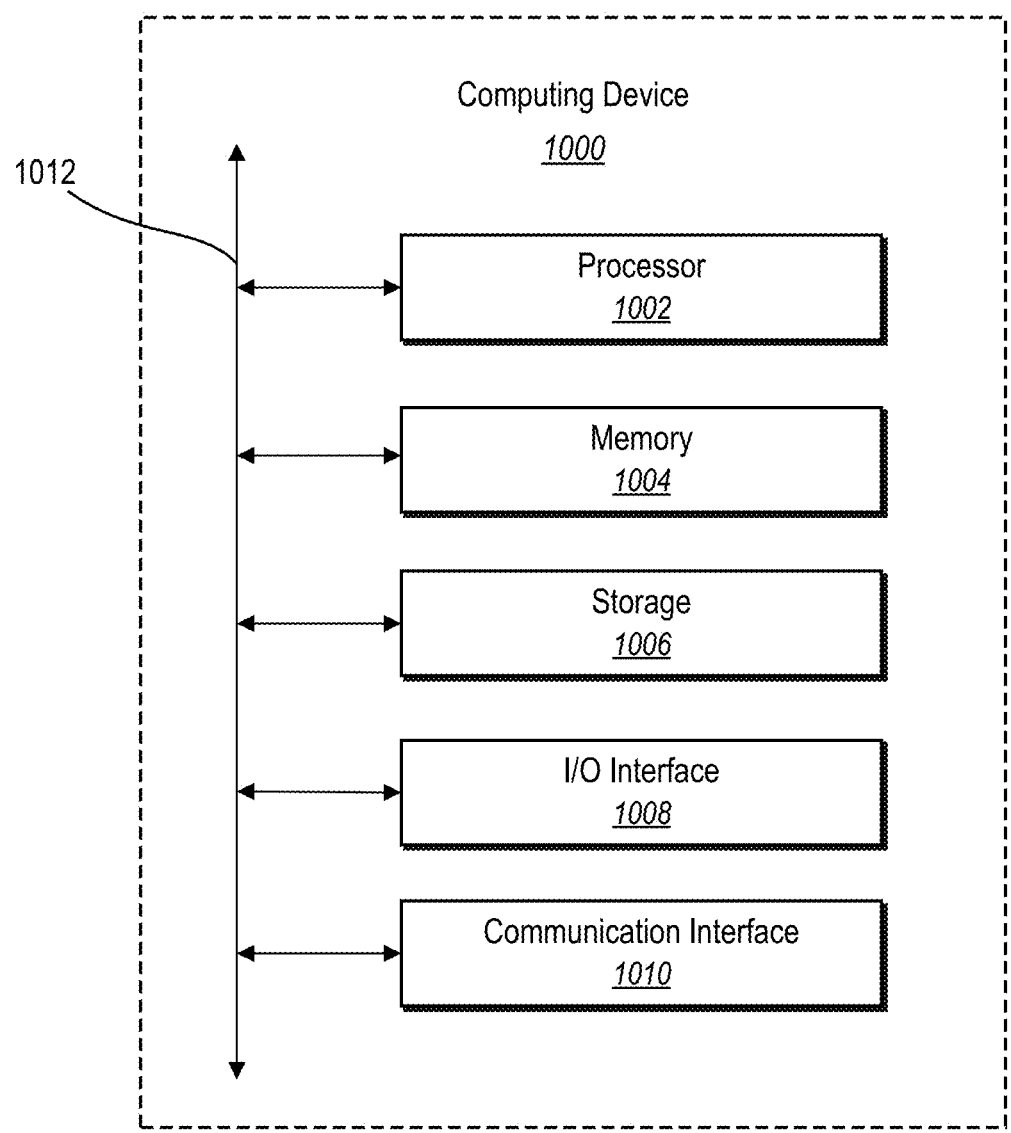
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 800, server device(s) 110, administrator device 106 and administrator application 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

Figure 11:
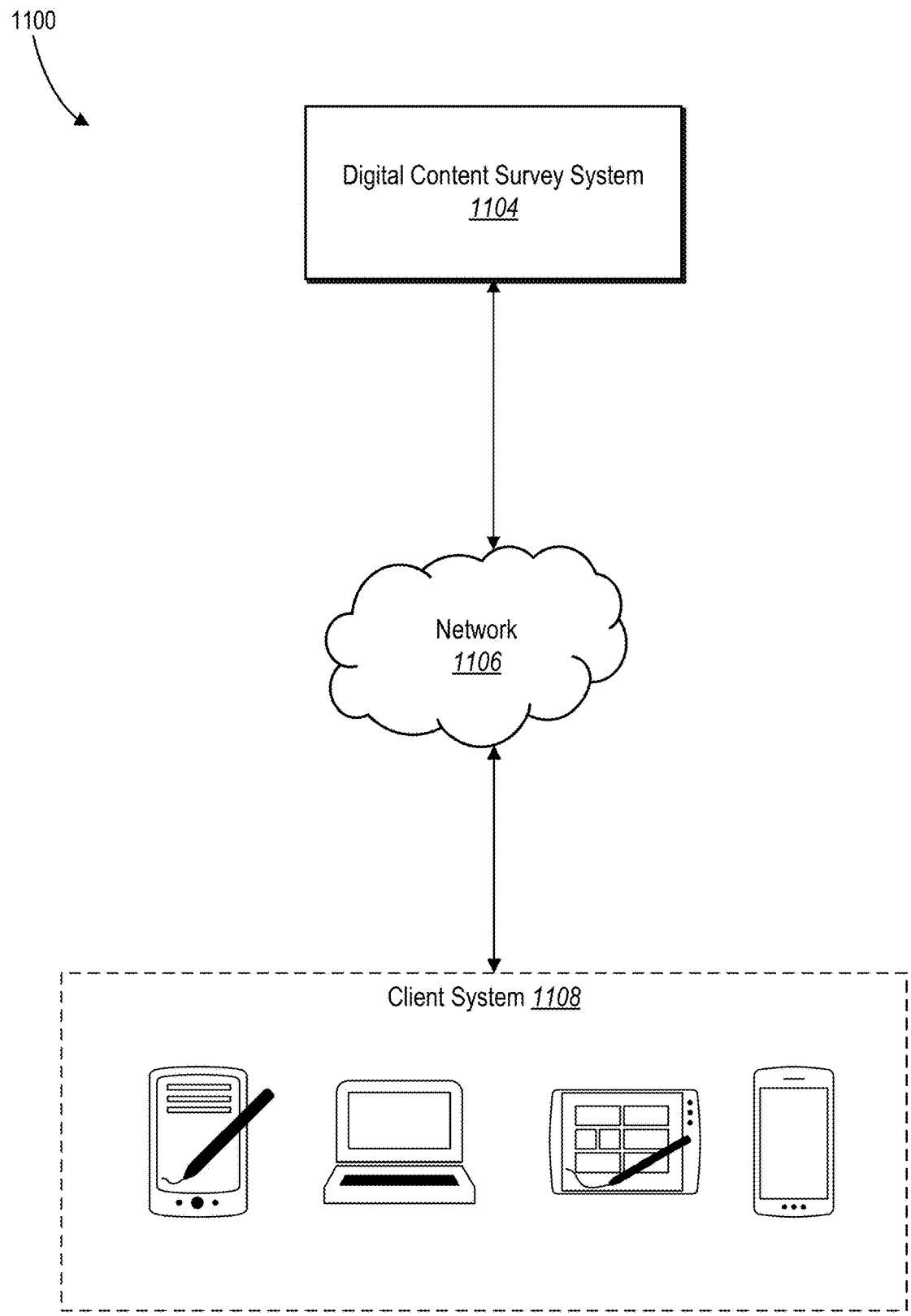
FIG. 11 illustrates a network environment of a digital survey system in accordance with one or more embodiments.

FIG. 11 illustrates an example network environment 1100 of the dynamic resource permissions system 114. Network environment 1100 includes a digital content survey system 1104 and a client system 1108 connected to each other by a network 1106. Although FIG. 11 illustrates a particular arrangement of the digital content survey system 1104, the client system 1108, and network 1106, this disclosure contemplates any suitable arrangement of client system 1108, digital content survey system 1104, and network 1106. As an example and not by way of limitation, two or more of the client system 1108, and digital content survey system 1104 may be connected to each other directly, bypassing network 1106. As another example, two or more of client system 1108 and digital content survey system 1104 may be physically or logically co-located with each other in whole, or in part. Moreover, although FIG. 11 illustrates a particular number of client system 1108, digital content survey system 1104, and networks 1106, this disclosure contemplates any suitable number of client system 1108, digital content survey system 1104, and networks 1106. As an example and not by way of limitation, network environment 1100 may include multiple client system 1108, digital content survey system 1104, and networks 1106.

This disclosure contemplates any suitable network 1106. As an example and not by way of limitation, one or more portions of network 1106 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1106 may include one or more networks 1106.

Links may connect client system 1108, and digital content survey system 1104 to network 1106 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client system 1108 may be an electronic device including hardware, software, or embedded logic components or a combination of two or more such components and capable of carrying out the appropriate functionalities implemented or supported by client system 1108. As an example and not by way of limitation, a client system 1108 may include any of the computing devices discussed above in relation to FIG. 11. A client system 1108 may enable a network user at client system 1108 to access network 1106.

In particular embodiments, client system 1108 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client system 1108 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client system 1108 one or more Hyper Text Markup Language ("HTML") files responsive to the HTTP request. Client system 1108 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, digital content survey system 1104 may include a variety of servers, sub-systems, programs, modules, logs, and data stores. In particular embodiments, digital content survey system 1104 may include one or more of the following: a web server, action logger, API-request server (Application Programming Interface-request server), relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Digital content survey system 1104 may also include suitable components such as network interfaces, security mechanisms, load balancers, failover servers, management-and-network-operations consoles, other suitable components, or any suitable combination thereof.

In particular embodiments, digital content survey system 1104 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., respondent device 118, customers).

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    identifying digital metadata comprising digital features of a plurality of entity members via one or more administrator devices corresponding to an entity;
    utilizing a digital permission mapping model to automatically map the plurality of entity members to a plurality of digital survey resource permission roles based on the digital metadata;
    defining one or more survey resource classes as comprising one or more survey attribute categories;
    identifying a request for a digital survey resource from a client device of an entity member;
    determining, utilizing a resource identification algorithm, one or more attribute values for the defined survey attribute categories corresponding to a survey resource class of the digital survey resource based on content of the digital survey resource; and
    providing access to the digital survey resource based on a digital survey resource permission role of the entity member from the plurality of digital survey resource permissions roles, wherein the digital survey resource permission role corresponds to permissions for survey resources corresponding to the one or more attribute values.

2. The method of claim 1, wherein the digital survey resource permission role comprises access permissions for a survey resource class and a corresponding attribute value.

3. The method of claim 2, wherein providing access to the digital survey resource based on the digital survey resource permission role comprises comparing the survey resource class and the corresponding attribute value of the access permissions to the one or more attribute values of the digital survey resource.

4. The method of claim 1, further comprising providing, for display, a survey resource class definition user interface comprising a survey resource class definition element and a survey attribute category definition element.

5. The method of claim 4, further comprising generating a survey resource class comprising a survey attribute category based on user interaction with the resource class definition element and the survey category definition element.

6. The method of claim 5, further comprising, generating the digital survey resource by defining the one or more attribute values of the digital survey resource corresponding to the survey attribute category.

7. The method of claim 1, further comprising:
    identifying modified metadata corresponding to the entity member; and
    utilizing the digital permission mapping model to automatically map the entity member to a modified digital survey resource permission role based on the modified metadata.

8. The method of claim 7, further comprising:
    identifying an additional request for an additional digital survey resource from one or more client devices of the entity member; and
    limiting access to the digital survey resource based on the modified digital survey resource permission role of the entity member.

9. A system comprising:
    at least one processor; and
    at least one non-transitory computer-readable storage medium storing instructions that, when executed by the at least one processor, cause the system to:
    identify digital metadata comprising digital features of a plurality of entity members via one or more administrator devices corresponding to an entity;
    utilize a digital permission mapping model to automatically map the plurality of entity members to a plurality of digital survey resource permission roles based on the digital metadata;
    define one or more survey resource classes as comprising one or more survey attribute categories;
    identify a request for a digital survey resource from a client device of an entity member;
    determine, utilizing a resource identification algorithm, one or more attribute values for the defined survey attribute categories corresponding to a survey resource class of the digital survey resource based on content of the digital survey resource; and
    provide access to the digital survey resource based on a digital survey resource permission role of the entity member from the plurality of digital survey resource permissions roles, wherein the digital survey resource permission role corresponds to permissions for survey resources corresponding to the one or more attribute values.

10. The system of claim 9, wherein the digital survey resource permission role comprises access permissions for a survey resource class of the one or more survey resource classes and a corresponding attribute value.

11. The system of claim 10, wherein providing access to the digital survey resource based on the digital survey resource permission role comprises comparing the survey resource class and the corresponding attribute value of the access permissions to the one or more attribute values of the digital survey resource.

12. The system of claim 9, further comprising instructions that, when executed by the at least one processor, cause the system to provide, for display, a survey resource class definition user interface comprising a survey resource class definition element and a survey attribute category definition element.

13. The system of claim 12, further comprising instructions that, when executed by the at least one processor, cause the system to generate a resource class comprising a survey attribute category based on user interaction with the resource class definition element and the survey category definition element.

14. The system of claim 13, further comprising instructions that, when executed by the at least one processor, cause the system to generate the digital survey resource by defining the one or more attribute values of the digital survey resource corresponding to the survey attribute category.

15. The system of claim 9, further comprising instructions that, when executed by the at least one processor, cause the system to:
   identify modified metadata corresponding to the entity member; and
   utilize the digital permission mapping model to automatically map the entity member to a modified digital survey resource permission role based on the modified metadata.

16. The system of claim 15, further comprising instructions that, when executed by the at least one processor, cause the system to:
   identify an additional request for an additional digital survey resource from one or more client devices of the entity member; and
   limit access to the digital survey resource based on the modified digital survey resource permission role of the entity member.

17. A non-transitory computer readable medium comprising instructions that, when executed by at least one processor, cause a computer system to:

identify digital metadata comprising digital features of a plurality of entity members via one or more administrator devices corresponding to an entity;
utilize a digital permission mapping model to automatically map the plurality of entity members to a plurality of digital survey resource permission roles based on the digital metadata;
define one or more survey resource classes as comprising one or more survey attribute categories;
identify a request for a digital survey resource from a client device of an entity member;
determine, utilizing a resource identification algorithm, one or more attribute values for the defined survey attribute categories corresponding to a survey resource class of the digital survey resource based on content of the digital survey resource; and
provide access to the digital survey resource based on a digital survey resource permission role of the entity member from the plurality of digital survey resource permissions roles, wherein the digital survey resource permission role corresponds to permissions for survey resources corresponding to the one or more attribute values.

18. The non-transitory computer readable medium of claim 17, wherein the digital survey resource permission role comprises access permissions for a survey resource class and a corresponding attribute value.

19. The non-transitory computer readable medium of claim 18, wherein providing access to the digital survey resource based on the digital survey resource permission role comprises comparing the survey resource class and the corresponding attribute value of the access permissions to attribute values of the digital survey resource.

20. The non-transitory computer readable medium of claim 17, further comprising instructions that, when executed by the at least one processor, cause the system to provide, for display, a survey resource class definition user interface comprising a survey resource class definition element and a survey attribute category definition element.

\* \* \* \* \*